US010783452B2

(12) United States Patent
Kajino

(10) Patent No.: US 10,783,452 B2
(45) Date of Patent: Sep. 22, 2020

(54) LEARNING APPARATUS AND METHOD FOR LEARNING A MODEL CORRESPONDING TO A FUNCTION CHANGING IN TIME SERIES

(71) Applicant: INTERNATIONAL BUSINESS MACHINES CORPORATION, Armonk, NY (US)

(72) Inventor: Hiroshi Kajino, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 701 days.

(21) Appl. No.: 15/581,814

(22) Filed: Apr. 28, 2017

(65) Prior Publication Data

US 2018/0314978 A1 Nov. 1, 2018

(51) Int. Cl.
*G06N 20/00* (2019.01)
*G06N 3/04* (2006.01)
*G06N 3/08* (2006.01)

(52) U.S. Cl.
CPC ............ *G06N 20/00* (2019.01); *G06N 3/049* (2013.01); *G06N 3/0472* (2013.01); *G06N 3/08* (2013.01)

(58) Field of Classification Search
CPC ...... G06N 20/00; G06N 3/0472; G06N 3/049; G06N 3/08
See application file for complete search history.

(56) References Cited

U.S. PATENT DOCUMENTS

2016/0092767 A1* 3/2016 Osogami ................. G06N 3/08
706/25

OTHER PUBLICATIONS

Takayuki Osogami and Makoto Otsuka, "Learning dynamic Boltzmann machines with spike-timing dependent plasticity", Sep. 29, 2015, arXiv, pp. 1-14. (Year: 2015).*
Takayuki Osogami, "Learning binary or real-valued time-series via spike-timing dependent plasticity", Dec. 15, 2016, arXiv, pp. 1-10. (Year: 2016).*

(Continued)

*Primary Examiner* — Kamran Afshar
*Assistant Examiner* — Ying Yu Chen
(74) *Attorney, Agent, or Firm* — Tutunjian & Bitetto, P.C.; Vazken Alexanian

(57) ABSTRACT

A computer-implemented method is provided for learning a model corresponding to a target function that changes in time series. The method includes acquiring a time-series parameter that is a time series of input parameters including parameter values expressing the target function. The method further includes propagating propagation values, which are obtained by weighting parameters values at time points before one time point according to passage of the time points, to nodes in the model associated with the parameter values at the one time point. The method also includes calculating a node value of each node using each propagation value propagated to each node. The method additionally includes updating a weight parameter used for calculating the propagation values propagated to each node, using a difference between the target function at the one time point and a prediction function obtained by making a prediction from the node values of the nodes.

25 Claims, 12 Drawing Sheets

(56) References Cited

OTHER PUBLICATIONS

G. Peter Zhang, "Time series forecasting using a hybrid ARIMA and neural network model", 2003, Neurocomputing 50 (2003), pp. 159-175. (Year: 2003).*
Hinton, et al., "Spiking Boltzmann Machines", Advances in Neural Information Processing Systems, Jun. 2000, pp. 122-128.
Sutskever, et al., Learning Multilevel Distributed Representations for High-Dimensional Sequences, Department of Computer Science University of Toronto, Oct. 25, 2006, 8 pages.
Sutskever, et al., "The Recurrent Temporal Restricted Boltzmann Machine", Advances in Neural Information Processing Systems 21 (NIPS 2008), Dec. 2008, 8 pages.

* cited by examiner

LEARNING APPARATUS AND METHOD FOR LEARNING A MODEL CORRESPONDING TO A FUNCTION CHANGING IN TIME SERIES

BACKGROUND

Technical Field

The present invention relates to a learning apparatus and a method for learning a model corresponding to real number time-series input data.

Description of the Related Art

As known, a neural network, Boltzmann machine, and the like can be applied to time-series data. Furthermore as known, a dynamic Boltzmann machine can learn a model corresponding to data input in time series through machine learning.

Such a Boltzmann machine or the like learns time-series data input to a finite number of nodes and makes a prediction, for example. It is therefore difficult for the Boltzmann machine or the like to adapt to a function that changes in time series. Hence, there is a need for an apparatus and method for learning a model corresponding to a function changing in time series.

SUMMARY

According to a first aspect of the present invention, a computer-implemented method is provided for learning a model corresponding to a target function that changes in time series. The method includes acquiring a time-series parameter that is a time series of input parameters including a plurality of parameter values expressing the target function. The method further includes propagating each of a plurality of propagation values, which are obtained by weighting each of a plurality of parameters values at a plurality of time points before one time point according to passage of the time points, to a plurality of nodes in the model associated with the plurality of parameter values at the one time point. The method also includes calculating a node value of each of the plurality of nodes using each propagation value propagated to each node. The method additionally includes updating a weight parameter used for calculating the propagation values propagated to each of the plurality of nodes, using a difference between the target function at the one time point and a prediction function obtained by making a prediction from the node values of the plurality of nodes. Also provided are a computer readable storage medium and an apparatus. The first aspect may be operable to learn a target function that changes in time series by updating the weight parameter in a manner to reduce the difference between the prediction function that is predicted from the node values of the plurality of nodes and the target function at the one time point.

According to a second aspect of the present invention, a computer-implemented method is provided that further includes, for the one time point, acquiring an output value of the target function corresponding to each input value in a first plurality of input values for the target function. The updating step includes updating the weight parameter using a difference between the output value of the target function corresponding to each input value in the first plurality of input values and an output value of the prediction function, at the one time point. Also provided are a computer readable storage medium and an apparatus. The second aspect may be operable to perform a simple update using a finite output value, because the update is performed based on the output value of the prediction function and the output value of the target function corresponding to each input value in the first plurality of input values.

According to a third aspect of the present invention, a computer-implemented method is provided in which each of the plurality of nodes corresponds to an input value in a second plurality of input values in a defined region of the target function. Also provided are a computer readable storage medium and an apparatus. The third aspect may be operable to improve the accuracy of learning the model corresponding to the target function, because the input values corresponding to the plurality of nodes are in a defined region in the target function.

According to a fourth aspect of the present invention, a computer-implemented method is provided in which the first plurality of input values and the second plurality of input values do not completely match. Also provided are a computer readable storage medium and an apparatus. The fourth aspect may be operable to improve the degree of freedom of the first plurality of input values, because it is possible to use a first plurality of input values differing from the second plurality of input values that correspond to the plurality of nodes.

According to a fifth aspect of the present invention, a computer-implemented method is provided of using a model that has been learned corresponding to a target function that changes in time series. The method includes acquiring a time-series parameter that is a time series of input parameters including a plurality of parameter values expressing the target function. The method further includes propagating each of a plurality of propagation values, which are obtained by weighting each of a plurality of parameters values at a plurality of time points before one time point according to passage of the time points, to a plurality of nodes in the model associated with the plurality of parameter values at the one time point. The method also includes calculating a node value of each of the plurality of nodes using each propagation value propagated to each node. The method additionally includes calculating a prediction function that is a prediction of the target function at the one time point from the node values of the plurality of nodes. Also provided are a computer readable storage medium and an apparatus. The fifth aspect may be operable to predict a target function that changes in time series from the node values of a finite number of nodes, using a model that has been learned.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Hereinafter, some embodiments of the present invention will be described. The embodiments do not limit the invention according to the claims, and all the combinations of the features described in the embodiments are not necessarily essential to means provided by aspects of the invention.

Figure 1:
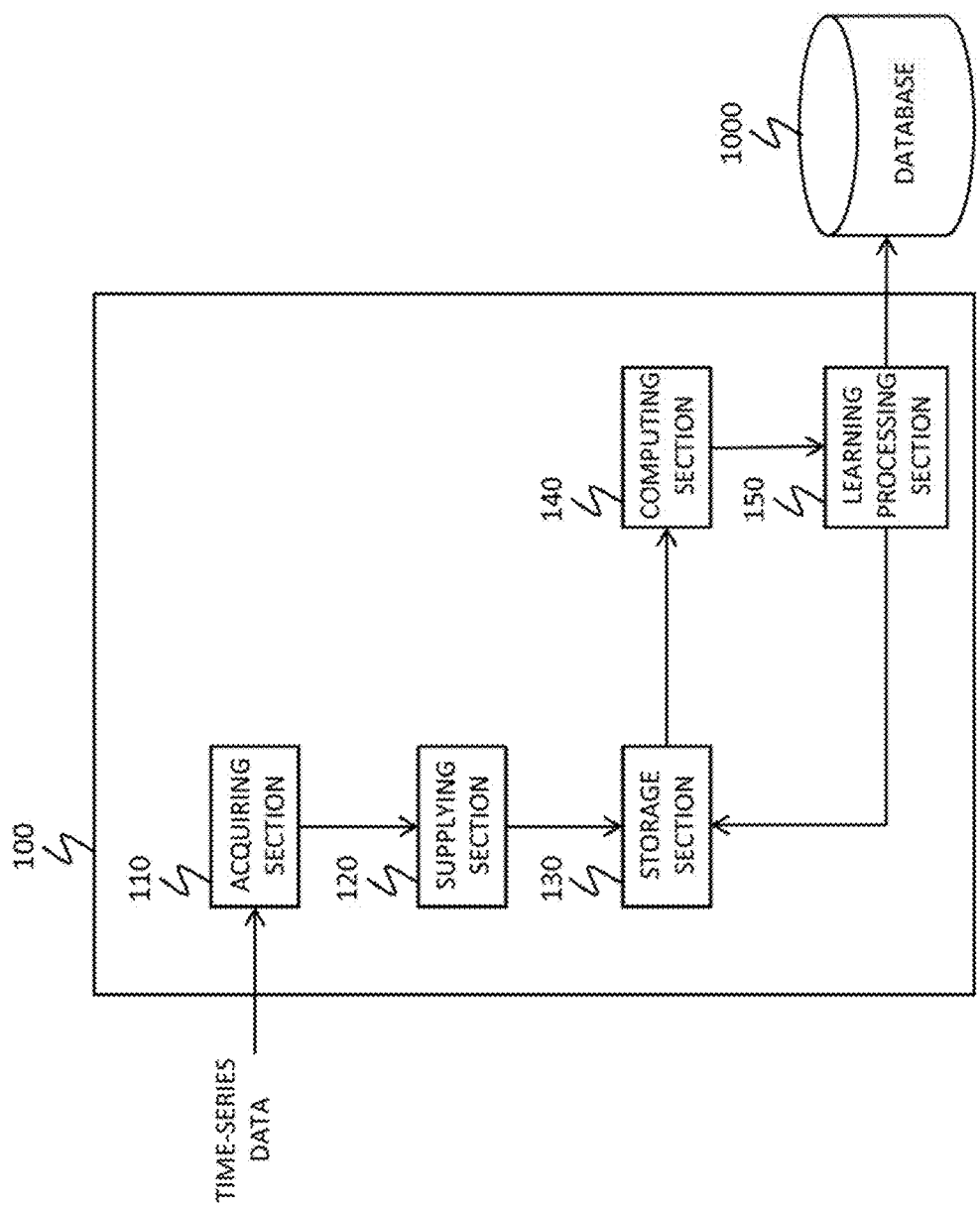
FIG. 1 shows an exemplary configuration of a learning apparatus 100, in accordance with an embodiment of the present invention.

FIG. 1 shows an exemplary configuration of a learning apparatus 100 according to an embodiment. The learning apparatus 100 may be an apparatus for learning a model 10 corresponding to time-series input data. The learning apparatus 100 may be operable to learn a model based on a Boltzmann machine by supplying time-series data to nodes of the model. The learning apparatus 100 includes an acquiring section 110, a supplying section 120, a storage section 130, a computing section 140, and a learning processing section 150.

The acquiring section 110 may be operable to acquire time-series input data. Time-series input data may be, for example, a data sequence in which a plurality of pieces of data are arranged along a time axis, such as moving image data. The acquiring section 110 may be connected to a device operated by a user or a device (sensor) that detects and outputs time-series data and may acquire the time-series input data from such a device. Alternatively, the acquiring section 110 may read and acquire time-series input data stored in a storage device in a predetermined format. Alternatively, the acquiring section 110 may be connected to a network and acquire time-series input data via the network. The acquiring section 110 may also store the acquired time-series input data in a storage device included in the learning apparatus 100.

The supplying section 120 may be operable to supply a plurality of input values corresponding to input data at one time point in the time-series input data to a plurality of nodes of a model. The supplying section 120 is connected to the acquiring section 110 and may handle, as training data, input data at one time point in the received time-series input data and supply input values at the one time point to corresponding nodes of the model. Input data at one time point may be the temporally newest data in a training data set for use in learning. Alternatively, input data at one time point may be temporally intermediate data in a training data set for use in learning. That is, input data at one time point may be selected arbitrarily from the time-series data.

The storage section 130 may be operable to store values of hidden nodes of the model in correspondence with a plurality of time points in the time-series input data. The storage section 130 may sample the values of hidden nodes corresponding to one time point and store these values in the hidden nodes corresponding to this time point. The storage section 130 may store the sampled values respectively in the hidden nodes corresponding to the time points for each time point.

The computing section 140 may be operational to compute a conditional probability of each input value at one time point on a condition that an input data sequence has occurred. Here, in the time-series input data, the pieces of data input to the respective nodes of the model at one time point are referred to as input values at one time point, and the pieces of data input to the respective nodes at the time points before the one time point are referred to as the input data sequence. A model used by the learning apparatus 100 may have a weight parameter between (i) a plurality of hidden nodes and a plurality of input values corresponding to input data at each time point prior to the one time point in an input data sequence and (ii) a plurality of hidden nodes corresponding to the one time point and a plurality of input nodes.

The computing section 140 may be operable to compute a conditional probability of each input value at one time point, on the basis of an input data sequence before the one time point in the time-series input data, the stored values of hidden nodes, and the weight parameter of the model. Furthermore, the computing section 140 may be operable to compute a conditional probability of the value of each hidden node at one time point on a condition that an input data sequences has occurred, based on an input data sequence before the one time point in the time-series input data and the weight parameter of the model.

The learning processing section 150 may be operable to increase a conditional probability of input data at one time point occurring on a condition that the input data sequence has occurred, by adjusting the weight parameter of the model. The learning processing section 150 may further adjust bias parameters that are given respectively to the plurality of nodes and hidden nodes of the model. The learning processing section 150 may supply the adjusted weight parameter and bias parameters of the model to a storage device, such as an external database 1000, to store these parameters in the storage device.

The above-described learning apparatus 100 according to the present embodiment may be operable to learn the model by adjusting the weight parameter and bias parameters of the model, based on input data at one time point in the time-series input data. The model according to the present embodiment is described with reference to FIG. 2.

Figure 2:
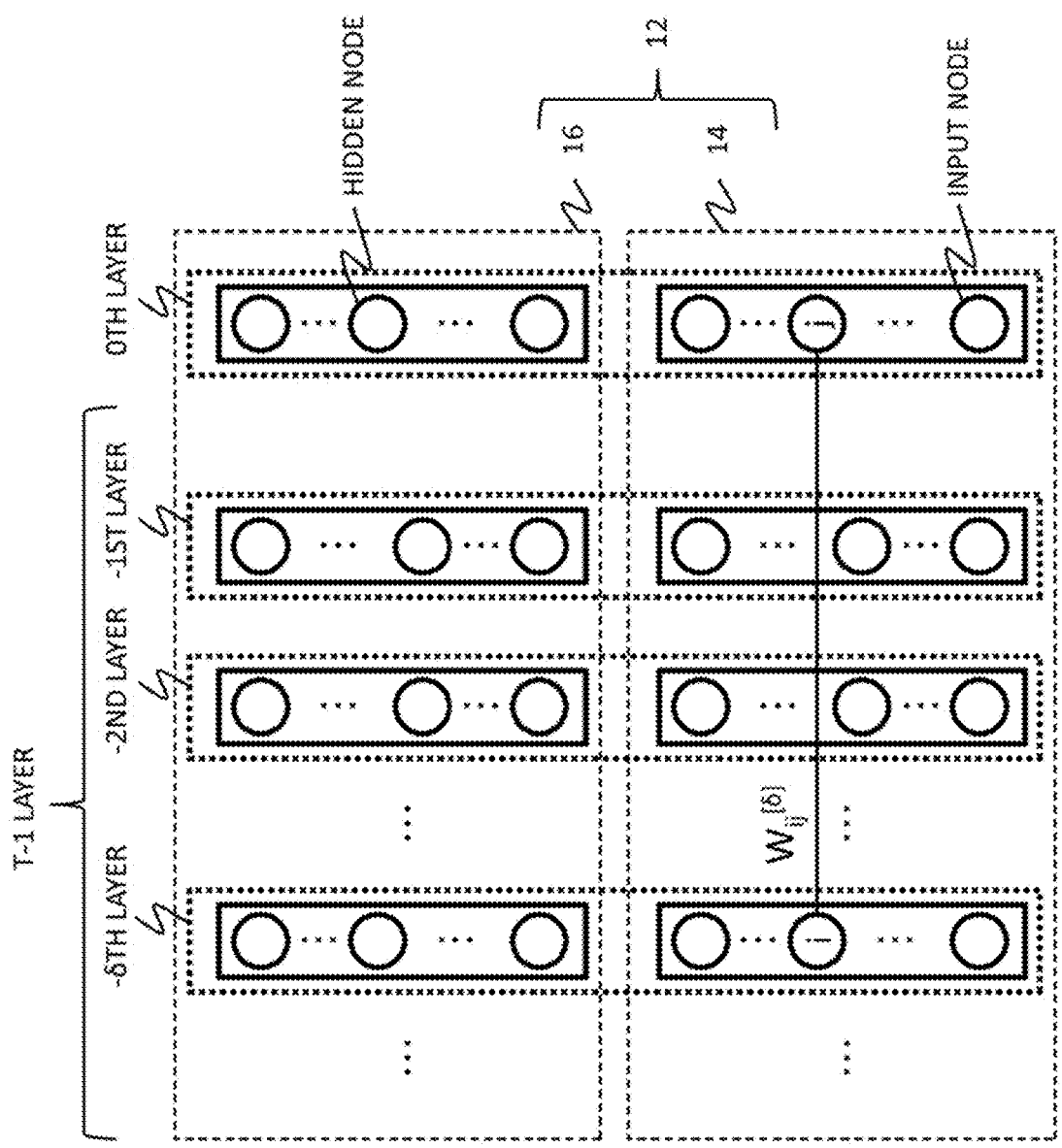
FIG. 2 shows an exemplary configuration of a model 10, in accordance with an embodiment of the present invention.

FIG. 2 shows an exemplary configuration of a model 10 according to the present embodiment. The model 10 includes a plurality of common layers 12. FIG. 2 shows an example including a total of T common layers 12. The model 10 may include a finite number of common layers 12. Each common layer 12 includes an input layer 14 and a hidden layer 16.

Each input layer 14 may be a layer corresponding to the time-series data. Each input layer 14 may correspond to a respective time point in the time-series data. Each input layer 14 may include a predetermined number of nodes. For example, the 0-th input layer may be a layer corresponding to input data at one time point in the time-series data. The 0-th input layer may include a plurality of nodes corresponding to the number of input values in this input data.

A total of T−1 input layers 14 other than the 0-th input layer 14 among the plurality of input layers may be input layers 14 corresponding to the input data sequence before the one time point in the time-series input data. For example, the −1st input layer may correspond to input data at a time point that temporally precedes the one time point by one time point, and the (−δ)-th input layer may correspond to input data at a time point that temporally precedes the one time point by δ time points. That is, a total of T−1 input layers other than the 0-th input layer each have the same number of nodes as the 0-th input layer and are respectively supplied with input values of corresponding input data values in the input data sequence, for example.

Each hidden layer 16 may correspond to a respective time point in the time-series data. For example, the 0-th hidden layer may be a layer corresponding to one time point in the time-series data. FIG. 2 shows an example including a total of T hidden layers 16. Each hidden layer 16 may include one or more hidden nodes, and the storage section 130 may store the values sampled at the one time point.

A total of T−1 hidden layers other than the 0-th hidden layer among the plurality of hidden layers 16 may be hidden layers 16 corresponding to time points before the one time point in the time-series data. For example, the −1st hidden layer corresponds to a time point that temporally precedes the input data of the one time point by one time point, and the storage section 130 stores the values sampled at the time point that temporally precedes the one time point by one time point. Furthermore, the (−δ)-th hidden layer may correspond to a time point that temporally precedes the input data of the one time point by δ time points, and the storage section 130 may store the values sampled at the time point that temporally precedes the one time point by δ time points. That is, a total of T−1 hidden layers other than the 0-th hidden layer each have the same number of nodes as the 0-th hidden layer and are respectively supplied with values of corresponding hidden nodes, for example.

As an example, in the case where the time-series input data is moving image data, the last image data of the moving image data corresponds to the 0-th input layer, and a plurality of nodes of the 0-th input layer each receive corresponding pixel data of the image data. Furthermore, the 0-th hidden layer corresponds to the final time point of the moving image data, and the storage section 130 may store values sampled at this final time point in the hidden nodes of the 0-th hidden layer.

In addition, the −1st input layer is supplied with image data that immediately precedes the last image data, and a plurality of nodes of the −1st input layer each receive corresponding pixel data of the immediately preceding image data. Furthermore, the −1 st hidden layer corresponds to the time point that immediately precedes the final time point, and for each of the plurality of nodes of the −1st hidden layer, the storage section 130 may store the values sampled at this immediately preceding time point. Similarly, the plurality of nodes of the (−δ)-th input layer each receive corresponding pixel data of image data that precedes the last image data by δ images, and the plurality of nodes of the (−δ)-th hidden layer each store corresponding sampling values at the time point that precedes the last time point by δ time points.

FIG. 2 shows an example in which each common layer 12 includes an input layer 14 and a hidden layer 16, but instead, one or more common layers 12 need not include a hidden layer 16. In such a case, the 0-th common layer to the (−m)-th common layer include input layers 14 and hidden layers 16, and the (−m−1)-th common layer to (−T+1)-th common layer may include input layers 14.

The plurality of nodes in the 0-th input layer and/or the plurality of hidden nodes in the 0-th hidden layer may each have a bias parameter. For example, the j-th node j in the common layer 12 has a bias parameter $b_j$.

The plurality of nodes in the 0-th input layer and the nodes of the hidden layer corresponding to the input data sequence and layers corresponding to the input data sequence before the one time point may respectively have weight parameters there between. There need not be weight parameters between the plurality of nodes in each input layer 14 and hidden layer 16.

Similarly, the plurality of nodes in the 0-th hidden layer and the nodes of the hidden layer corresponding to the input data sequence and layers corresponding to the input data sequence before the one time point may respectively have weight parameters there between. That is, the plurality of nodes of the 0-th common layer and the nodes of the plurality of common layers before the one time point may respectively have weight parameters there between.

FIG. 2 shows a concept of a weight parameter $W_{ij}^{[\delta]}$ between the node j of the 0-th input layer and a node i of the (−δ)-th layer. FIG. 2 shows an example in which the model 10 has the same number of input layers 14 and layers 16, each input layer 14 includes I nodes, and each hidden layer 16 includes H hidden nodes. In the present embodiment, the input layers 14 and hidden layers 16 are expressed by one common layer 12 that has a plurality of nodes $x_j^{[t]}$. The first to I-th nodes (1≤j≤I) of the common layer 12 indicate the nodes of the input layer 14, and the (I+1)-th to (I+H)-th nodes (I+1, j, I+H) indicate hidden nodes.

For example, the weight parameter $W_{ij}^{[\delta]}$ shown in FIG. 2 indicates a weight parameter between two nodes of an input layer 14. Similarly, the weight parameter $W_{ij}^{[\delta]}$ may include weight parameters from an input node to a hidden node, from a hidden node to an input node, and between to hidden nodes. A specific example of a weight parameter $W_{ij}^{[\delta]}$ is as shown in the Expression below. In the present embodiment, a weight parameter from an input node or hidden node to an input node is referred to as a "weight parameter to an input node," and a weight parameter from an input node or hidden node to a hidden node is referred to as a 'weight parameter to a hidden node."

$$W_{ij}^{[\delta]} = \hat{w}_{ij}^{[\delta]} + \hat{w}_{ij}^{[-\delta]} \qquad \text{Expression 1}$$

$$\hat{w}_{ij}^{[\delta]} = \begin{cases} 0 & \text{if } \delta = 0 \\ \sum_{k \in K} u_{i,j,k} \lambda_k^{\delta - d_{ij}} & \text{if } \delta \geq d_{ij} \\ \sum_{l \in L} -v_{i,j,l} \mu_k^{-\delta} & \text{otherwise} \end{cases}$$

Here, $u_{i,j,k}$ and $v_{i,j,l}$ are learning parameters that are learning targets, for example. Furthermore, $\lambda_k^{t1}$ and $\mu_l^{t2}$ are predefined parameters that change in a predetermined manner in accordance with a time point difference δ between the hidden nodes and input data in the input data sequence before the one time point and the hidden nodes and input data at the one time point (t1=δ−$d_{ij}$, t2=−δ). That is, the weight parameter $W_{ij}^{[\delta]}$ may be a parameter based on the learning parameters $u_{i,j,k}$ and $v_{i,j,l}$ and the predefined parameters $\lambda_k^{t1}$ and $\mu_l^{t2}$.

The weight parameter $W_{ij}^{[\delta]}$ may be a parameter based on a positive value, which is based on a product of the first learning parameter $u_{i,j,k}$ and the first predefined parameter $\lambda_k^{t1}$, and a negative value, which is based on a product of the second learning parameter $v_{i,j,l}$ and a second predefined parameter $\mu_l^{t2}$. Specifically, in the case where the time point difference $\delta$ is greater than or equal to a predetermined delay constant $d_{ij}$, the weight parameter $W_{ij}^{[\delta]}$ may be a positive value based on a product of the first learning parameter $u_{i,j,k}$ and the first predefined parameter $\lambda_k^{t1}$. In the case where the time point difference $\delta$ is less than the delay constant $d_{ij}$ and is not equal to 0, the weight parameter $W_{ij}^{[\delta]}$ may be a negative value based on a product of the second learning parameter $v_{i,j,l}$ and the second predefined parameter $\mu_l^{t2}$. In addition, in the case where the time point difference $\delta$ is equal to 0, the weight parameter $W_{ij}^{[\delta]}$ may be equal to 0.

In addition, in the case where the time point difference $\delta$ is greater than or equal to the predetermined delay constant $d_{ij}$, the weight parameter $W_{ij}^{[\delta]}$ may be based on a plurality of positive values that are based on the products $u_{i,j,k} \cdot \lambda_k^{t1}$ of a plurality of sets of the first learning parameter $u_{i,j,k}$ and the first predefined parameter $\lambda_k^{t1}$ respectively from among the plurality of first learning parameters $u_{i,j,k}$ and the plurality of first predefined parameters $\lambda_k^{t1}$. In addition, in the case where the time point difference $\delta$ is less than the predetermined delay constant $d_{ij}$ and is not equal to 0, the weight parameter $W_{ij}^{[\delta]}$ may be based on a plurality of negative values that are based on products $v_{i,j,l} \cdot \mu_l^{t2}$ of a plurality of sets of the second learning parameter $v_{i,j,l}$ and the second predefined parameter $\mu_l^{t2}$ respectively from among the plurality of second learning parameters $v_{i,j,l}$ and the plurality of second predefined parameters $\mu_l^{t2}$.

A predefined parameter may be a parameter based on a value obtained by raising a predetermined constant to the power of a value based on the time point difference $\delta$. The first predefined parameter $\lambda_k^{t1}$ is a parameter whose value gradually decreases as the time point difference $\delta$ increases, for example. In this case, the first predefined parameter $\lambda_k^{t1}$ may be a value obtained by raising a first constant $\lambda_k$, which is greater than 0 and less than 1, to the power of a value obtained by subtracting the predetermined delay constant $d_{ij}$ from the time point difference $\delta$ ($\delta - d_{ij} = t1$). In addition, the second predefined parameter $\mu_l^{t2}$ may be a parameter whose value gradually decreases as the time point difference $\delta$ increases, for example. In this case, the second predefined parameter $\mu_l^{t2}$ may be a value obtained by raising a second constant $\mu_l$, which is greater than 0 and less than 1, to the power of a negative value of the time point difference $\delta$ ($-\delta = t2$).

The above-described model 10 according to the present embodiment may be operable to form a Boltzmann machine. That is, the model 10 may be a Boltzmann machine to which time-series data is applied. The model 10 may be a Boltzmann machine that includes hidden layers into which are input values differing from the time-series data, in addition to the input layers into which the time-series data is input. The learning apparatus 100 according to the embodiment learns the model 10 by adjusting the learning parameters $u_{i,j,k}$ and $v_{i,j,l}$ and the bias parameter $b_j$ while sampling and storing the values of the hidden nodes, by using, as training data, input data at one time point that is supplied to the 0-th input layer of the model 10. A learning operation of the learning apparatus 100 is described with reference to FIG. 3.

Figure 3:
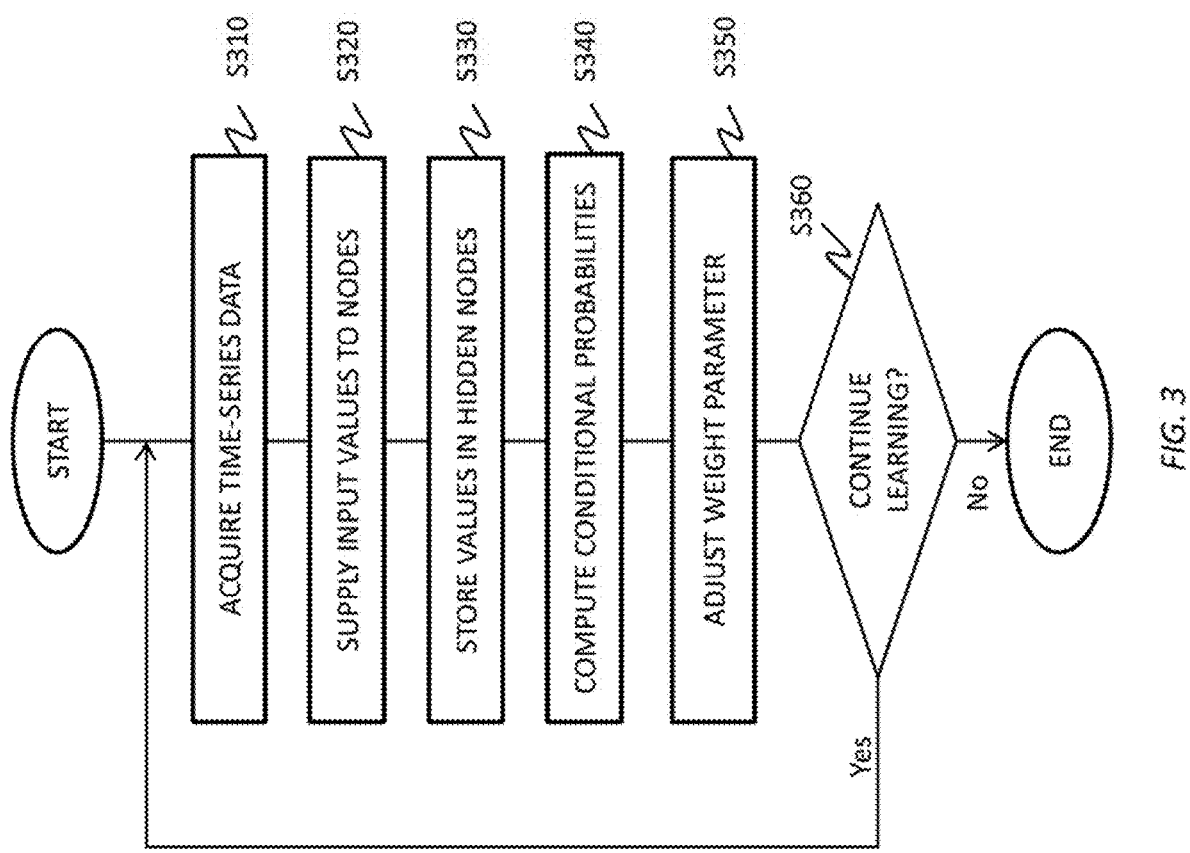
FIG. 3 shows a flow of an operation of the learning apparatus 100, in accordance with an embodiment of the present invention.

FIG. 3 shows a flow of an operation of the learning apparatus 100 according to the present embodiment. In the present embodiment, the learning apparatus 100 may be operable to learn the model 10 corresponding to time-series input data and determine the learning parameters $u_{i,j,k}$ and $v_{i,j,l}$ and the bias parameter $b_j$, by executing the processing steps of S310 to S360. In the present embodiment, first, an example is described in which the determination of the weight parameters to the hidden nodes and the weight parameters to the input nodes is performed by the learning apparatus 100 using substantially the same operation.

First, the acquiring section 110 may acquire time-series data (S310). The acquiring section 110 may acquire time-series data of a duration equivalent to a total of T layers from the 0-th layer to the $(-T+1)$-th layer of the model 10. The acquiring section 110 acquires, for example, T pieces of image data in time-series that form the moving image data.

Then, the supplying section 120 may supply a plurality of input values corresponding to the input data of the time-series input data at one time point to the plurality of input nodes of the 0-th input layer of the model 10 (S320). Here, $x_{[1,1]}^{[0]}$ ($=x_j^{[0]}$, $1 \leq j \leq 1$) denotes input data supplied to the 0-th input layer.

The supplying section 120 supplies, for example, I input values $x_j^{[0]}$ corresponding to input data $x_{[1,1]}^{[0]}$ of the time-series input data at the most recent time point to the corresponding nodes j of the 0-th input layer ($1 \leq j \leq I$). For example, the supplying section 120 supplies I pieces of pixel data included in the last piece of image data of T pieces of image data arranged in time series to form the moving image data to I nodes of the 0-th input layer. The supplying section 120 may supply a value of 1 or 0 as the pixel data to each node of the 0-th input layer. If the duration of the time-series input data is shorter than T, the supplying section 120 may supply the data to a number of layers from the 0-th input layer corresponding to the length of the time series, and may supply a value of 0, for example, to the nodes of the rest of the layers.

Then, the supplying section 120 may supply a plurality of input values corresponding to the input data sequence before the one time point to the plurality of nodes included in respective layers from the $-1$st input layer to the $(-T+1)$-th input layer of the model 10. Here, let $x_j^{(-T,-1]}$ denote input data supplied to layers from the $-1$st input layer to the $(-T+1)$-th input layer ($1 \leq j \leq I$). The term $(-T, -1]$ indicates layers from the $(-T+1)$-th layer to the $-1$st layer. That is, the input data $x_j^{(-T,-1]}$ in the time-series data denotes a history up to the input data $x_j^{[0]}$, for example.

Next, the storage section 130 samples the values of a plurality of hidden nodes corresponding to the one time point, and respectively stores these values in the corresponding plurality of hidden nodes of the 0-th hidden layer (S330). The storage section 130 may arbitrarily or randomly input values of 1 or 0. The storage section 130 stores H sampled values in the corresponding hidden nodes j of the 0-th hidden layer, for example ($I+1 \leq j \leq I+H$).

The storage section 130 may store the values of the hidden nodes before the one time point respectively in a plurality of nodes in each of the corresponding hidden layers from the $-1$st hidden layer to the $(-T+1)$-th hidden layer of the model 10. Here, let let $x_j^{(-T,-1]}$ denote the values of the hidden nodes stored in the layers from the $-1$st hidden layer to the $(-T+1)$-th hidden layer ($I+1 \leq j \leq I+H$). That is, the values $x_j^{(-T,-1]}$ input to the nodes of each common layer 12 before the one time point denote a history up to the input values $x_j^{[0]}$ input to the nodes of the 0-th common layer, for example ($1 \leq j \leq I+H$).

Then, the computing section 140 may compute conditional probabilities of each input value $x_j^{[0]}$ ($1 \leq j \leq I$) of an input node at the one time point, based on the input values $x_j^{(-T,-1]}$ ($1 \leq j \leq I+H$) of the plurality of nodes of the $(-T+1)$-th common layer to the $-1$st common layer and the weight parameter $W_{ij}^{[\delta]}$ (S340). The computing section 140 computes a probability $\langle x_j^{[0]} \rangle_\theta$ of the input value $x_j^{[0]}$ ($1 \leq j \leq I$) of the j-th node of the 0-th input layer being equal to 1 by substituting 1 for $x_j^{[0]}$ in the following expression, based on the history $x^{(-T,-1]}$ ($1 \leq j \leq I+H$) of the plurality of nodes of the common layer 12.

$$\langle X_j^{[0]} \rangle_\theta = \qquad \text{Expression 2}$$

$$p_{\theta,j}(x_j^{[0]} | x^{(-T,-1]}) = \frac{\exp(-\tau^{-1} E_{\theta,j}(x_j^{[0]} | x^{(-T,-1]}))}{1 + \exp(-\tau^{-1} E_{\theta,j}(x_j^{[0]} | x^{(-T,-1]}))}$$

In the present embodiment, an example is described in which the input value $x_j^{[0]}$ of each node is binary, i.e., 1 or 0, but the value of the input value $x_j^{[0]}$ is not limited to these values. Furthermore, in the step for computing the conditional probabilities of each input value $x_j^{[0]}$ ($1 \leq j \leq I$) of the 0-th input layer, the computing section 140 may compute the conditional probabilities of the values $x_j^{[0]}$ ($I+1 \leq j \leq I+H$) of the 0-th hidden layer.

Expression 2 is derived as a Boltzmann machine from a known probability formula. For example, $\theta$ denotes a set of parameters to be computed, and the formula $\theta = (b_j, u_{i,j,k}, v_{i,j,l})$ is established. In addition, $\tau$ may be a parameter that is dependent on a known "system temperature" of the Boltzmann machine, and may be preset by a user or the like. Also, $E_{\theta,j}(x_j^{[0]} | x^{-(-T,-1]})$ of Expression 2 is computed by using the following expression.

$$E_{\theta,j}(x_j^{[0]} | x^{(-T,-1]}) = -b_j x_j^{[0]} - \sum_{t=-T}^{-1} (x^{[t]})^\top (x^{[t]}) W_{:,j}^{[-t]} x_j^{[0]} \qquad \text{Expression 3}$$

Here, "T" denotes a transpose, ":" denotes 1 to n in a case where n ($=I+H$) denotes the number of nodes, and ":,j" indicates extraction of the j-th column. That is, the second term on the right side of Expression 3 is denoted by the following expression, for example.

$$\sum_{t=-T}^{-1} (x^{[t]})^\top W_{:,j}^{[-t]} x_j^{[0]} = (x_1^{[t]}, x_2^{[t]}, \ldots, x_n^{[t]}) \begin{pmatrix} W_{1,j}^{[-t]} \\ W_{2,j}^{[-t]} \\ \vdots \\ W_{n,j}^{[-t]} \end{pmatrix} x_j^{[0]} = \qquad \text{Expression 4}$$

$$\sum_{i=1}^{N} \left( \sum_{k \in K} u_{i,j,k} \alpha_{i,j,k} - \sum_{l \in L} v_{i,j,l} \beta_{i,j,l} - \sum_{l \in L} v_{j,i,l} \gamma_{i,l} \right) x_j^{[0]}$$

Here, $\alpha_{i,j,k}$, $\beta_{i,j,l}$, and $\gamma_{i,l}$ are denoted by the following expressions.

$$\alpha_{i,j,k} \equiv \sum_{t=-T}^{-d_{ij}} \lambda_k^{-t-d_{ij}} x_i^{[t]} \qquad \text{Expression 5}$$

$$\beta_{i,j,l} \equiv \sum_{t=-d_{ij}+1}^{-1} \mu_l^t x_i^{[t]} \qquad \text{Expression 6}$$

$$\gamma_{i,l} \equiv \sum_{t=-T}^{-1} \mu_l^{-t} x_i^{[t]} \qquad \text{Expression 7}$$

Accordingly, $P_{\theta,j}(1 | x_j^{(-T,-1]})$ obtained by substituting 1 for $x_j^{[0]}$ of Expression 2 can be computed from Expression 3 by substituting 1 for $x_j^{[0]}$ in expression 5. Note that predetermined initial values (for example, 0) may be substituted for the parameter set $\theta = (b_j, u_{i,j,k}, v_{i,j,l})$. In this way, the computing section 140 can compute a conditional probability $\langle x_j^{[0]} \rangle_\theta$ of each input value $x_j^{[0]}$ at the one time point that is denoted by Expression 2.

Then, the learning processing section 150 may adjust the parameter set $\theta = (b_j, u_{i,j,k}, v_{i,j,l})$ (S350). When adjusting the bias parameter $b_j$, the learning processing section 150 may determine a direction of the change in the bias parameter $b_j$ by using the following expression.

$$\frac{\partial}{\partial b_j} \log P_\theta(x_{[1,l]}^{[0]} | x^{(-T,-1]}) = \tau^{-1} (x_j^{[0]} - \langle X_j^{[0]} \rangle_\theta) \qquad \text{Expression 8}$$

Here, $x_j^{[0]}$ on the right side of Expression 8 denotes an input value supplied as training data by the supplying section 120, and $\langle x_j^{[0]} \rangle_\theta$ on the right side denotes a probability computed by using Expression 2 ($1 \leq j \leq I$). The bias parameter $b_j$ for each input node ($1 \leq j \leq I$) may be adjusted and updated as denoted by the following expression by using Expression 8. Note that a coefficient c is a parameter predetermined by the user or the like.

$$b_j \leftarrow b_j + c \frac{1}{\tau} (x_j^{[0]} - \langle X_j^{[0]} \rangle_\theta) \qquad \text{Expression 9}$$

That is, the learning processing section 150 adjusts the bias parameter $b_j$ so as to increase the conditional probability of the input value $x_j^{[0]}$ of the node of the 0-th input layer occurring, on a condition that the history $x^{(-T,-1]}$ of the common layer 12 has occurred. The learning processing section 150 may iteratively perform updating of the bias parameter $b_j$ denoted by Expression 9 and computing of the probability $\langle x_j^{[0]} \rangle_\theta$ denoted by Expression 2, to determine the bias parameter $b_j$. The learning processing section 150 stops updating the bias parameter $b_j$ and determines the bias parameter $b_j$ if a difference in the bias parameter $b_j$ before and after updating is less than or equal to a predetermined threshold. If a bias parameter $b_j$ is also set for a hidden node, the learning processing section 150 may determine the bias parameter $b_j$ of the hidden node in the same manner.

Alternatively, the learning processing section 150 may decide upon the bias parameter $b_j$ by iteratively updating the bias parameter $b_j$ a predetermined number of times. If a difference in the bias parameter $b_j$ before and after updating is greater than or equal to the predetermined threshold even after the bias parameter $b_j$ has been updated the predetermined number of times, the learning processing section 150 may stop updating the bias parameter $b_j$ and inform the user that the parameter does not converge.

Similarly, when updating the learning parameter $u_{i,j,k}$, the learning processing section 150 may determine the direction of a change in the learning parameter $u_{i,j,k}$ by using the following expression.

$$\frac{\partial}{\partial u_{i,j,k}} \log P_\theta(x_{[1,I]}^{[0]} \mid x^{(-T,-1]}) = \tau^{-1} \alpha_{i,j,k}(x_j^{[0]} - \langle X_j^{[0]} \rangle_\theta) \quad \text{Expression 10}$$

In addition, when updating the learning parameter $v_{i,j,l}$, the learning processing section 150 may determine the direction of a change in the learning parameter $v_{i,j,l}$ by using the following expression.

$$\frac{\partial}{\partial v_{i,j,l}} \log P_\theta(x_{[1,I]}^{[0]} \mid x^{(-T,-1]}) = \quad \text{Equation 11}$$
$$-\tau^{-1} \beta_{i,j,l}(x_j^{[0]} - \langle X_j^{[0]} \rangle_\theta) - \tau^{-1} \gamma_{j,l}(x_i^{[0]} - \langle X_i^{[0]} \rangle_\theta)$$

In the same manner as the updating of the bias parameter $b_j$, the learning processing section 150 may iteratively perform updating of the learning parameters $u_{i,j,k}$ and $v_{i,j,l}$ corresponding to the input nodes ($1 \leq j \leq I$) and computing of the probability $\langle x_j^{[0]} \rangle_\theta$ to determine the learning parameters $u_{i,j,k}$ and $v_{i,j,l}$ corresponding to the input nodes ($1 \leq j \leq I$). Alternatively, the learning processing section 150 may iteratively perform an operation for updating the parameter set $\theta = (b_j, u_{i,j,k}, v_{i,j,l})$ and then computing the probability $\langle x_j^{[0]} \rangle_\theta$ denoted by Expression 2 to determine the parameter set $\theta = (b_j, u_{i,j,k}, v_{i,j,l})$.

As described above, the learning processing section 150 according to the present embodiment can decide upon the learning parameters $u_{i,j,k}$ and $v_{i,j,l}$ and the bias parameter $b_j$ through learning. The learning apparatus 100 may then determine whether to continue learning (S360). The learning apparatus 100 may continue learning until it performs the learning process a predetermined number of times, or may continue learning until a stop command is input by the user. Alternatively, the learning apparatus 100 may continue learning until it can no longer acquire time-series data.

If the learning apparatus 100 continues learning (S360: YES), the process may return to step S310, in which the acquiring section 110 acquires the next time-series data, and the learning apparatus 100 may then perform learning of the model 10 based on the next time-series data. For example, the supplying section 120 supplies the 0-th input layer with the next image data in the image data acquired by the acquiring section 110. Furthermore, the storage section 130 samples the values of the hidden layers and stores these values in the 0-th hidden layer. Then, values held in the t-th common layer ($-T<t<0$) may be supplied to the (t-1)-th common layer. The values held in the ($-T+1$)-th layer may be deleted. The learning apparatus 100 may perform learning by using image data supplied to the layers from the 0-th input layer to the ($-T+1$)-th input layer as training data and using the values stored in the layers from the 0-th hidden layer to the ($-T+1$)-th hidden layer.

In this way, the supplying section 120 and the storage section 130 may sequentially acquire new input values $x_j^{[0]}$ at the next time point corresponding to the nodes of the 0-th common layer in the model 10. Then, the computing section 140 may compute a conditional probability $\langle x_j^{[0]} \rangle_\theta$ of the new input value $x_j^{[0]}$ on a condition that the history has occurred for each common layer before the next time point. The learning processing section 150 may adjust the weight parameter so as to increase the conditional probability of the new input value occurring on the condition that this history has occurred.

If the learning processing section 150 stops learning (S360: NO), the learning processing section 150 may output the learning parameters $u_{i,j,k}$ and $v_{i,j,l}$ and the bias parameter $b_j$ that have been determined and store the parameters in the external database 1000 or the like.

As described above, the learning apparatus 100 according to the present embodiment may be operable to apply, to time-series input data that is input in time series, a model having a total of T layers by associating one time point with the 0-th common layer and an input data sequence before the one time point with T-1 layers. The learning apparatus 100 may be operable to apply a model having hidden nodes to each common layer 12. That is, the learning apparatus 100 may be operable to form a time-evolution Boltzmann machine that predicts input data at one time point on the basis of the input data sequence and hidden node values.

The learning apparatus 100 is able to learn the model by computing a conditional probability of the input value $x_j^{[0]}$ at the one time point occurring, based on the input value $x^{(-T,-1]}$, which is a history, for a model that takes time evolution into consideration. Furthermore, since the learning apparatus 100 learns the model using hidden nodes in addition to the time-series input data, the expressive ability and learning ability can be improved.

A description has been given of the learning apparatus 100 according to the present embodiment that sequentially acquires new input data from time-series input data and adjusts the weight parameter for each input data acquired. Instead of this configuration, the learning apparatus 100 may acquire time-series input data of a predetermined duration and then adjust the weight parameters. For example, the learning processing section 150 adjusts the weight parameters collectively for a plurality of time points in response to acquisition of new input data at a plurality of time points corresponding to D layers.

Figure 4:
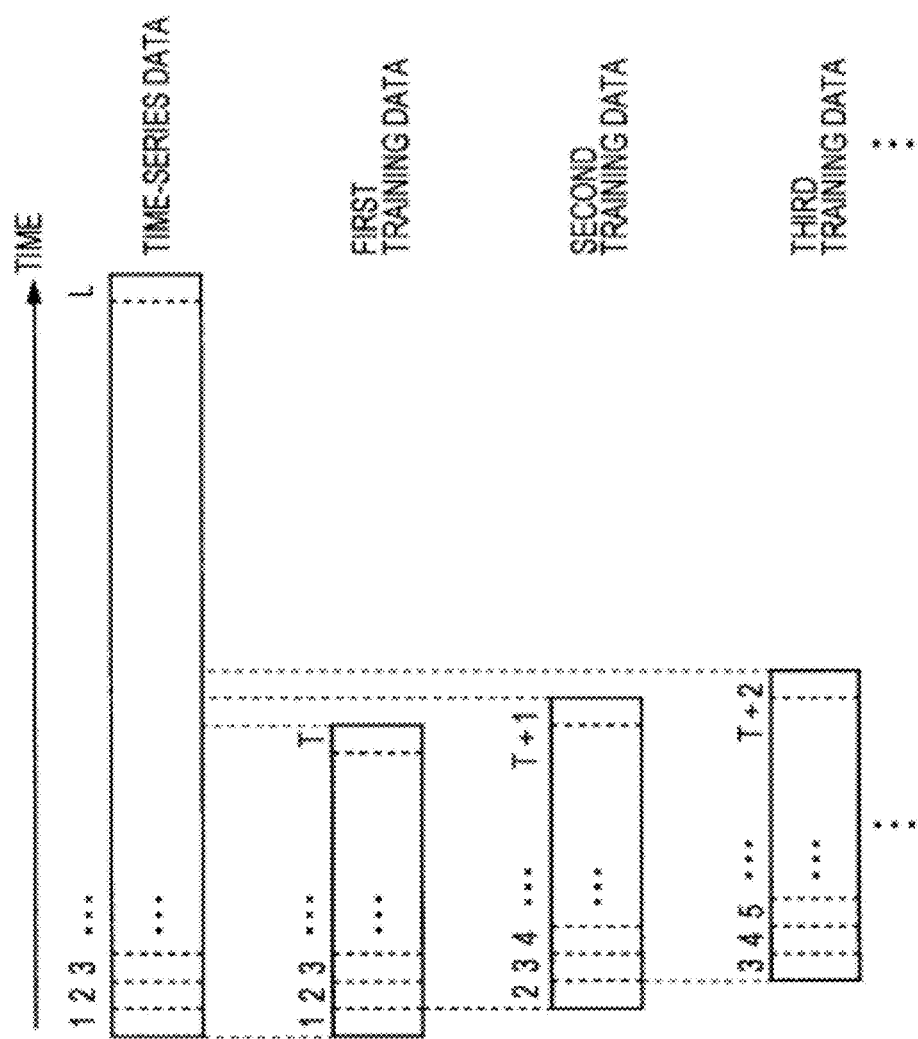
FIG. 4 shows an example of structures of time-series data and training data for use in learning in the present embodiment, in accordance with an embodiment of the present invention.

FIG. 4 shows an example of structures of time-series data and training data for use in learning in the present embodiment. In FIG. 4, the horizontal axis denotes time. FIG. 4 shows an example in which the learning apparatus 100 uses time-series data $y^{[1, L]}$ having a duration L that is longer than a duration T of time-series data $y^{1, T]}$ used as training data by the learning apparatus 100 during learning. In this case, the learning processing section 150 may be operable to adjust weight parameters for a plurality of time points all together, in response to input data at a plurality of time points being newly acquired.

The learning apparatus 100 first performs learning using, as first training data, a time-series data segment of the time-series data from a time 1 to a time T. In this case, as described in FIG. 3, the learning apparatus 100 may perform learning by setting the time-series data and corresponding hidden layer values from the time 1 to the time T as each input value of the common layer 12 at the one time point in order, and incrementally shifting the time points one at a time toward the future. The learning apparatus 100 may use data at a time T as each input value $x_j^{[0]}$ at the one time point, and continue learning until the time-series data from the time 1 to a time T-1 becomes the input data sequence $x^{(-T,-1]}$ (i.e. the history).

Next, the learning apparatus 100 performs learning using, as second training data, a time-series data segment of the time-series data from a time 2 to a time T+1. The learning apparatus 100 may sequentially use each of D pieces of data in the second training data as the input value $x_j^{[0]}$ at the one time point. In this case, the learning apparatus 100 may shift the time point in the interval from the time 2 to the time T+1 one time point at a time toward the future and use, as the history, the corresponding time-series data and hidden nodes of the interval from the time 2 to the time T. In this way, the learning apparatus 100 may adjust the parameters D times for the D input values $x_j^{[0]}$ and the corresponding D histories. That is, the learning apparatus 100 may use a stochastic gradient technique in which the learning method described with Expressions 8 to 11 is performed.

Alternatively, the learning apparatus 100 may acquire D time-series data sets, generate a plurality of training data sets from time-sequence data segments of a duration of L, and collectively perform learning for D layers. Specifically, the learning apparatus 100 may perform the stochastic gradient technique described using Expressions 8 to 11 collectively for D layers, by using the following expression.

$$\theta \leftarrow \theta + \eta \sum_{x \in \{y^{(t,t+T-1)}|0 \leq t < D\}} \nabla_\theta \log P_\theta(x_{[1,t]}^{[0]} \mid x^{(-T,-1)}) \quad \text{Expression 12}$$

Figure 5:
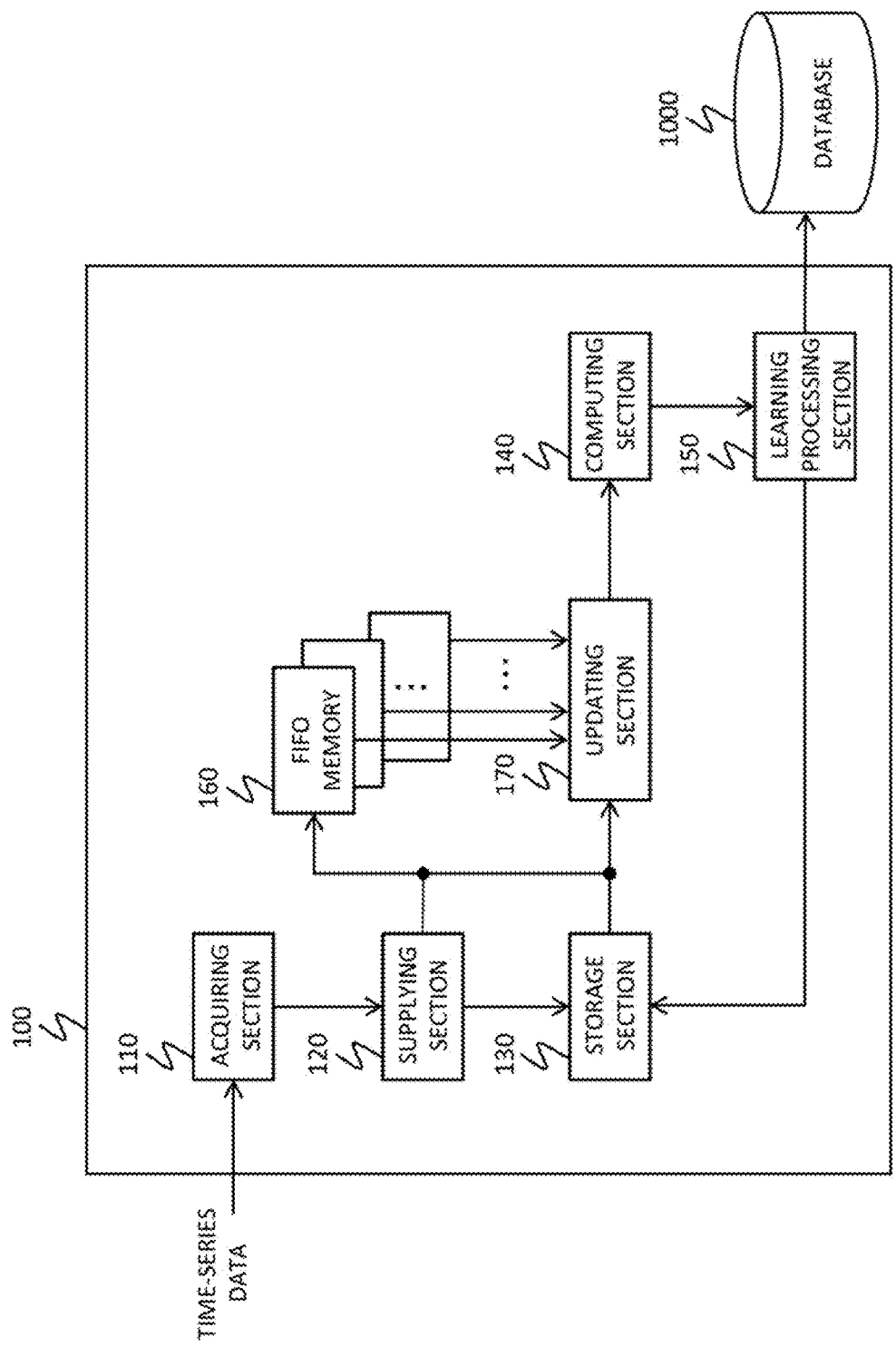
FIG. 5 shows a first modification of the learning apparatus 100, in accordance with an embodiment of the present invention.

FIG. 5 shows a first modification of the learning apparatus 100 according to the present embodiment. Components of the learning apparatus 100 shown in FIG. 5 that perform substantially the same operations as those of the learning apparatus 100 according to the embodiment illustrated in FIG. 1 are denoted by the same reference numerals, and a description thereof is omitted. In a case where time-series data of a duration L such as described in FIG. 4 is provided, the learning apparatus 100 according to the present modification may be operable to efficiently update parameters by using FIFO memories and learn a model corresponding to the time-series input data. The learning apparatus 100 according to the present modification further includes FIFO memories 160 and an updating section 170.

Each of the FIFO memories 160 may sequentially store input data and output the stored data after a predetermined number of storages have been performed. Each of the FIFO memories 160 may be a memory that first outputs data that has been stored first (FIFO: First In, First Out).

Each of the FIFO memories 160 may sequentially store an input value of the common layer 12 and output the input value after a predetermined number of storages have been performed. The learning apparatus 100 may include a plurality of FIFO memories 160, the number of which is greater than or equal to the number of nodes n of the model. The plurality of FIFO memories 160 is desirably provided to have a one-to-one correspondence with the plurality of nodes of the common layer 12. That is, each of the plurality of FIFO memories 160 may be provided in a manner to store a history for a respective node of the common layer 12 or to update the history thereof.

The plurality of FIFO memories 160 are connected to the acquiring section 110 and the storage section 130, and sequentially store input values corresponding to new input data of the common layer 12. The plurality of FIFO memories 160 are also connected to the updating section 170 and sequentially supply the data stored therein to the updating section 170.

The updating section 170 may be operable to update a plurality of update parameters that are based on the hidden nodes and the input data sequence of the time-series input data before the one time point, from values at a prior time point to values at the one time point, on the basis of values of the update parameters and values of the hidden nodes and input values corresponding to the input data to be reflected next. The updating section 170 may update the update parameters by using values input to the FIFO memories 160 and values output from the FIFO memories 160. The updating section 170 may be connected to the acquiring section 110 and the storage section 130, and may receive values input to the FIFO memories 160. Alternatively, the updating section 170 may receive values input to the FIFO memories 160 from the acquiring section 110 via the supplying section 120.

Here, the update parameters are $\alpha_{i,j,k}$ and $\gamma_{i,l}$ shown in Expressions 5 and 7. In this case, the update parameters are based on input values i ($1 \leq i \leq I$) corresponding to input data of the input data sequence at each time point and the predefined parameters $\lambda_k^{t1}$ and $\mu_i^{t2}$ of the weight parameter $W_{ij}^{[\delta]}$ between this input value i and the target input node j ($1 \leq j \leq I$) or hidden node j ($I+1 \leq j \leq I+H$), for example. As another example, the update parameters are based on the hidden node i ($I+1 \leq i \leq I+H$) at each time point and the predefined parameters $\lambda_k^{t1}$ and $\mu_i^{t2}$ of the weight parameter $W_{ij}^{[\delta]}$ between this hidden node i and the target input node j ($1 \leq j \leq I$) or hidden node j ($I+1 \leq j \leq I+H$), for example.

The update parameters may be updated every time the acquisition of the time-series input data by the acquiring section 110 and the storage of the sampling values by the storage section 130 are performed sequentially. The above-described learning apparatus 100 according to the present modification may be operable to learn a modification of the model 10. The modification of the model 10 is described with reference to FIG. 6.

Figure 6:
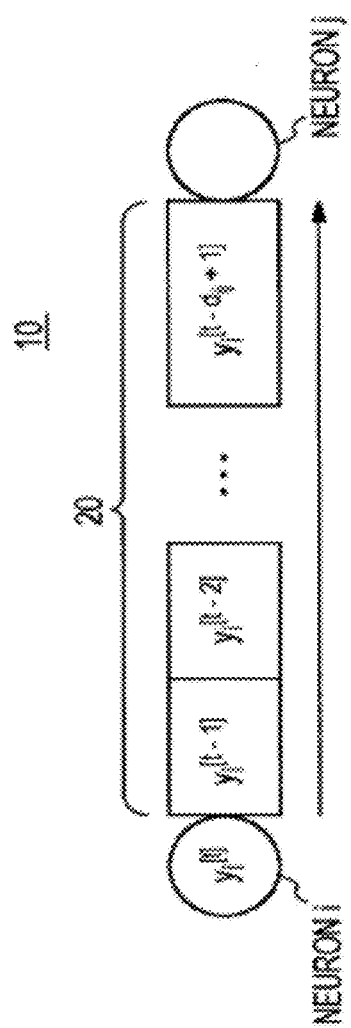
FIG. 6 shows a modification of the model 10, in accordance with an embodiment of the present invention.

FIG. 6 shows a modification of the model 10 according to the present embodiment. The model 10 according to the modification needs not have the layered structure including T layers shown in FIG. 2. FIG. 6 shows an example of a model corresponding to one of the FIFO memories 160. Accordingly, the overall configuration of the model 10 according to the present modification includes a storage area that is equivalent to the 0-th common layer in FIG. 2 including the training data, and a number of the configurations illustrated in FIG. 6 equal to the number of nodes n (=I+H). Neurons i and j and a FIFO sequence 20 of the model 10 according to the present modification are described below.

The neuron i may be equivalent to the input terminal of the FIFO memory 160. An input value $y_i^{[t]}$ ($1 \leq i \leq I$) of each node in the input data of the input data sequence at each time point t and a corresponding value $y_i^{[t]}$ among the values $y_i^{[t]}$ ($I+1 \leq i \leq I+H$) of the hidden nodes at each time point are sequentially input to the neuron i. The neuron i may set the value $y_i^{[t]}$ input thereto as the current input value. Then, at a time point t+1, the neuron i may supply the input value $y_i^{[t]}$ input at the time point t to the updating section 170 and to the FIFO sequence 20 as the previous input value and may hold the input value $y_i^{[t+1]}$ at the time point t+1 as the current input value.

The FIFO sequence 20 may store $d_{ij}-1$ of the latest input values received from the neuron i. The FIFO sequence 20 may supply the $d_{ij}-1$ input values stored therein to the updating section 170. The updating section 170 may be operable to compute the values of the update parameters denoted by Expression 6 by using the input values supplied by the FIFO sequence. If the FIFO sequence 20 holds input values from the time point t-1 to the time point $t-d_{ij}+1$, the FIFO sequence 20 is denoted by the following expression.

$$q_{i,j} \equiv (y_i^{[t-1]}, y_i^{[t-d_{ij}+2]}, y_i^{[t-d_{ij}+1]}) \quad \text{Expression 13:}$$

After the input value $y_i^{[t1]}$ is input to the neuron i at the time point t1, the FIFO sequence 20 may store the input value $y_i^{[t1]}$ up until a time point t3 (=t1+$d_{ij}$-1) which is a predetermined time period $d_{ij}-1$ after the next time point t2 (=t1+1) of the time point t1. At the next time point t4 (=t3+1=t1+$d_{ij}$), the FIFO sequence 20 may supply the input value $y_i^{[t1]}$ to the neuron j. The input value $y_i^{[t1]}$ supplied to the neuron j at the time point t4 is immediately supplied to the updating section 170 at the time point t4. However, the input value $y_i^{[t1]}$ that the neuron j has received from the FIFO sequence 20 at the time point t4 does not serve as an input for the neuron j, and the input value $y_i^{[t4]}$ may be input to the neuron j at the time point t4.

The neuron j may be equivalent to the output terminal of the FIFO memory 160, and the neuron j may receive the input value $y_i^{[t1]}$ input to the neuron i at the time point t1, via the FIFO sequence after the time period $d_{ij}$, i.e. at the time point t1+$d_{ij}$. That is, the model 10 from the neuron i to the neuron j via the FIFO sequence 20 may correspond to the FIFO memory 160 that stores $d_{ij}$ pieces of input data. In addition, the neuron i of the model 10 according to the modification may correspond to, for example, a node for an input data sequence such as a node i of the (−δ)-th common layer of the model 10 shown in FIG. 2, and in this case the neuron j may correspond to, for example, the node j of the 0-th common layer. At the time point t1+$d_{ij}$, the neuron j may supply the received input value $y_i^{[t1]}$ to the updating section 170.

As described above, the model 10 according to the present modification may supply the input values at the time point t−1 and the time point t−$d_{ij}$+1 to the updating section 170 at the time point t. In this way, the updating section 170 can update the update parameters by adding the corresponding input value in the input data to be reflected next to the update parameters for the time point before the one time point, and then multiplying the resulting sum by a predetermined constant. Note that the update parameters denoted by Expression 8 may be computed in accordance with Expression 8 by using the input values stored in the FIFO sequence 20 that are supplied to the updating section 170.

For example, the update parameter $\gamma_{i,l}$ denoted by Expression 7 can be updated by using the input values supplied to the updating section 170 and the second predefined parameter. Specifically, the updating section 170 can compute the update parameter $\gamma_{i,l}$ to be used in the current learning by performing computing at the time point t according to the following expression by using the prior update parameter $\gamma_{i,l}$ and the input value $y_i^{[t-1]}$ received from the neuron i at the time point t.

$$\gamma_{i,l} \leftarrow \mu_l(\gamma_{i,l} + y_i^{[t-1]}) \quad \text{Expression 14:}$$

Figure 7:
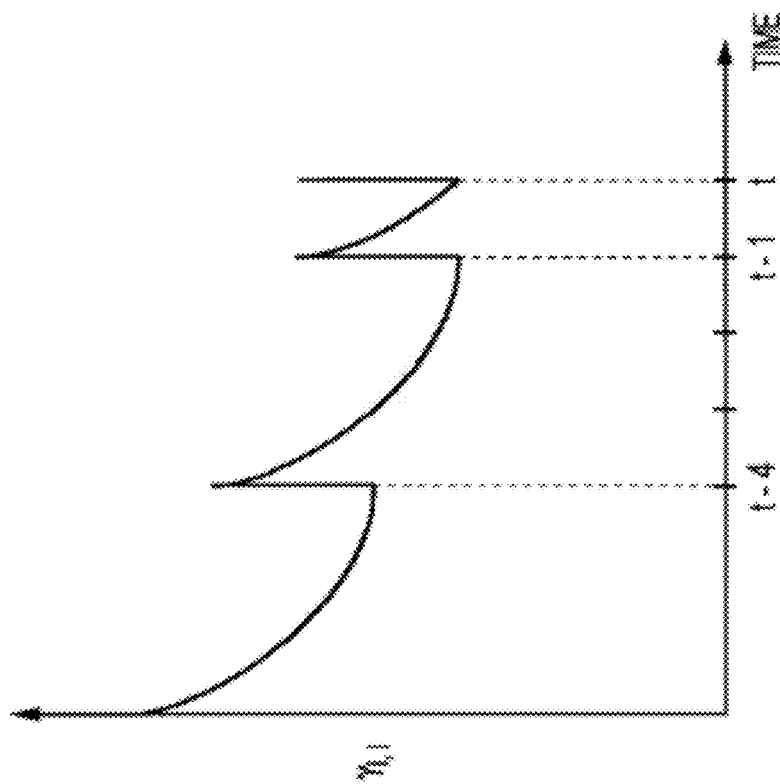
FIG. 7 shows an example of a temporal change in the update parameter $\gamma_{i,l}$, in accordance with an embodiment of the present invention.

FIG. 7 shows an example of a temporal change in the update parameter $\gamma_{i,l}$ according to the present embodiment. FIG. 7 shows an example in which values greater than 0 (for example, 1) are input to the neuron i as the input value at time points t−5, t−2, and t−1, and these input values are supplied to the updating section 170 at time points t−4, t−1, and t. The second predefined parameter $\mu_l$ is a parameter whose value gradually decreases as the time point difference increases. Accordingly, the update parameter $\gamma_{i,l}$ computed by the updating section 170 tends to decrease as time passes from when the input value of 1 is input to when the next input is given.

The update parameter $\alpha_{i,j,k}$ denoted by Expression 5 can be updated by using the input values supplied to the updating section 170 and the first predefined parameter $\lambda_k$. Specifically, the updating section 170 can compute the update parameter $\alpha_{i,j,k}$ to be used in the current learning by performing computing at the time point t according to the following expression, by using the prior update parameter $\alpha_{i,j,k}$ and the input value $y_i^{[t-dij]}$ received from the neuron j at the time point t.

$$\alpha_{i,j,k} \leftarrow \lambda_k(\alpha_{i,j,k} + y_i^{[t-dij]}) \quad \text{Expression 15:}$$

Figure 8:
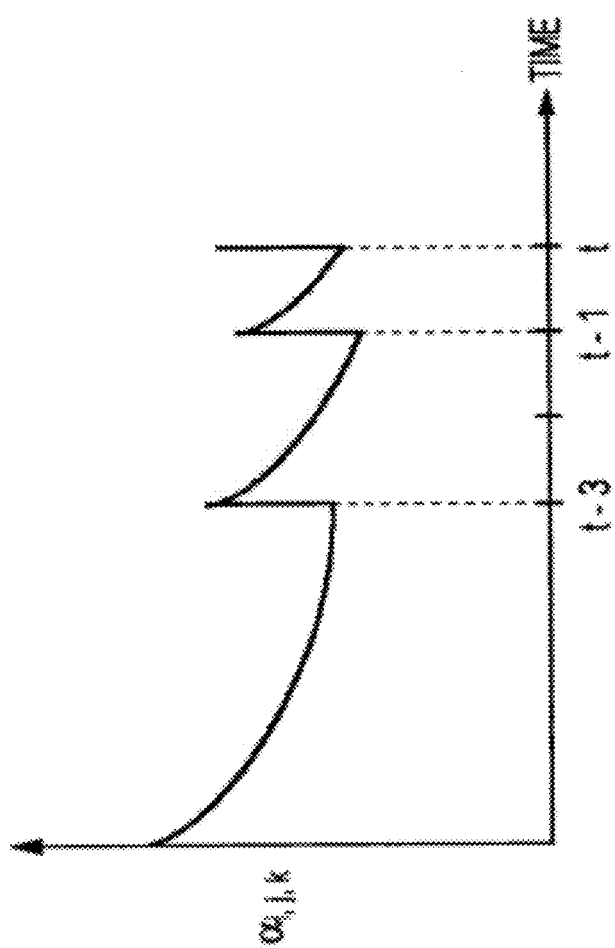
FIG. 8 shows an example of a temporal change in the update parameter $\alpha_{i,j,k}$, in accordance with an embodiment of the present invention.

FIG. 8 shows an example of a temporal change in the update parameter $\alpha_{i,j,k}$ according to the present embodiment. FIG. 8 shows an example in which values greater than 0 (for example, 1) are supplied to the neuron j as the input value at time points t−3, t−1, and t. The first predefined parameter $\lambda_k$ is a parameter whose value gradually decreases as the time point difference increases. Accordingly, the update parameter $\alpha_{i,j,k}$ computed by the updating section 170 tends to decrease as time passes from when the input value of 1 is input to when the next input is given.

As described above, the learning apparatus 100 according to the present modification can update the update parameters $\alpha_{i,j,k}$ and $\gamma_{i,l}$ by applying the model 10 shown in FIG. 6 using the FIFO memories 160 and the updating section 170. Note that the updating section 170 can apply the model 10 according to the present modification, for example, by acquiring the input values $x_j^{[t-1]}$ at the time point t−1 from the input data input to the FIFO memories 160 and acquiring the input values $x_i^{[t-dij]}$ at the time point t−$d_{ij}$ from the output of the FIFO memories 160.

In addition, the learning apparatus 100 may update the parameter $\beta_{i,j,l}$ through substantially the same operation as the operation described in FIG. 3. Specifically, the computing section 140 can compute the parameter $\beta_{i,j,l}$ by determining the sum of products of the second predefined parameter $\mu_l$ and the input value $x_i$ ($y_i$ in the present modification) for time points from t−1 to t−$d_{ij}$+1 as indicated by Expression 6.

In this way, the computing section 140 according to the present modification can compute, by using the plurality of update parameters, conditional probabilities of input data values at one time point on the condition that the hidden node values and input data sequence have occurred. Then, the learning processing section 150 can determine the learning parameters $u_{i,j,k}$ and $v_{i,j,l}$ and the bias parameter $b_j$ by performing substantially the same operation as the operation described in FIG. 3.

In other words, the learning apparatus 100 according to the present embodiment can determine the weight parameter and bias parameters in a manner to increase the probability of predicting the input value to be input to the input layer 14 of the common layer 12, based on the past values that have been input to the common layer 12 of the model 10 before the one time point. Furthermore, the learning apparatus 100 can improve the prediction accuracy, the expressive ability, the learning efficiency, and the like of the input values input to the input layer 14 by having the common layer 12 include the hidden layer 16 in addition to the input layer 14.

The learning apparatus 100 according to the present embodiment described above is an example in which a value that is unrelated to the prediction made by the learning apparatus 100 is sampled and input as the hidden node value to be input to the hidden layer 16. Instead of this, the learning apparatus 100 may determine the hidden node value by using a history of the conditional probability of the values of the nodes of the common layer 12. The learning apparatus 100 may determine the weight parameter to a hidden node by using this conditional probability history. The learning apparatus 100 can improve the prediction accuracy by using the conditional probability history of nodes of the common layer 12 to determine the weight parameter to the hidden node and the hidden node value.

In this case, the computing section 140 may compute the conditional probability $p_{j,t}$ of the value of a node j of the common layer 12 at one time point t based on the values input to the corresponding node j of the common layer 12 at each time point before the one time point t, and store this conditional probability in the storage section or the like. In addition to the computation of the conditional probability of each input value of the input layer 14 at the one time point described above, the computing section 140 may compute the conditional probability of each hidden node in the layer 16 at the one time point in the same manner. That is, the computing section 140 may use the plurality of update parameters to compute the conditional probability of the value of each hidden node and each input data value at the one time point on the condition that an input data sequence has occurred. Here, the computing section 140 may store the conditional probability $p_{j,t}$ in a FIFO or the like.

The computing section 140 may be operable to compute a total likelihood, after the learning by the learning apparatus 100 has continued. The computing section 140 computes the total likelihood $p_j$ as shown in the following expression, based on the conditional probabilities $p_{j,t-K+1}$, $p_{j,t-K+2}, \ldots, p_{j,t}$ computed by K instances of learning from the time point t−K+1 to the time point t, for example. The total likelihood $p_j$ in Expression 16 indicates a total sum of the conditional probabilities, as an example, but the total likelihood $p_j$ may be at least one of a sum, weighted sum, product, or weighted product of the conditional probabilities. Furthermore, K may be an integer greater than or equal to 2, and if the computing section 140 stores the conditional probabilities $p_{j,t}$ in a FIFO or the like, the length of the FIFO sequence may be equal to the value of K.

$$p = \sum_{s=t-k+1}^{t} p_s \qquad \text{Expression 16}$$

The computing section 140 may supply the total likelihood $p_j$ to the storage section 130. The storage section 130 may sample the values $x_j^{[t]}$ of the hidden nodes of the hidden layer 16 at the one time point, based on the most recent likelihood $p_{j,t}$. That is, the storage section 130 according to the present embodiment may be operable to sample the value of each hidden node at the one time point, by using the conditional probability of the value of each hidden node at the one time point. For example, the storage section 130 samples the values of the hidden nodes based on the history of the conditional probabilities computed by the computing section 140. That is, the storage section 130 may sample the values of the hidden nodes after the learning operation of the learning processing section 150 has been performed a plurality of times. The storage section 130 may store a value of 0 in the hidden nodes as the sampling value, until the learning operation of the learning processing section 150 has been performed a plurality of times.

The storage section 130 may store a value of 1 or 0 in the hidden node j as the sampling result, according to the result of a comparison between the value of the total likelihood $p_j$ and a threshold value. In this way, when predicting the time series data to be input to the input layer 14, the storage section 130 can store a more preferable value as the hidden node value by performing sampling based on the history of past conditional probabilities.

The learning processing section 150 may be operable to determine the weight parameter based on the total likelihood $p_j$. In this case, the learning processing section 150 may compute update amounts $\Delta u_{i,j,k}$ and $\Delta v_{i,j,k}$ for the learning parameters $u_{i,j,k}$ and $v_{i,j,k}$ in the weight parameter for one hidden node j at the one time point. For example, the learning processing section 150 may compute these update amounts $\Delta u_{i,j,k}^{[t]}$ and $\Delta v_{i,j,k}^{[t]}$ as shown in the following expression, based on the value $x_j^{[t]}$ of the one hidden node j at the one time point t and on the conditional probability $<X_j^{[t]}>$ of the value of this hidden node j at the one time point t on the condition that the input data sequence has occurred (I+1≤j≤I+H).

$$\Delta u_{i,j,k}^{[t]} = \alpha_{i,j,k}^{[t-1]}(x_j^{[t]} - <X_j^{[t]}>)$$

$$\Delta v_{i,j,l}^{(1)[t]} = \beta_{i,j,l}^{[t-1]}(<X_j^{[t]}> - X_j^{[t]})$$

$$\Delta v_{i,j,l}^{(2)[t]} = \gamma_{i,j,l}^{[t-1]}(<X_i^{[t]}> - x_i^{[t]}) \qquad \text{Expression 17:}$$

Here, the update amount $\Delta v_{i,j,k}^{[t]}$ is equal to $\Delta u_{i,j,k}^{(1)[t]} + \Delta u_{i,j,k}^{(2)[t]}$. The conditional probability $<X_j^{[t]}>$ of the value of the hidden node j may be computed by the computing section 140 using Expression 2. The learning processing section 150 may store the computed update amounts $\Delta v_{i,j,k}^{[t]}$, $\Delta u_{i,j,k}^{(1)[t]}$, and $\Delta u_{i,j,k}^{(2)[t]}$ in the storage section or the like. The learning processing section 150 may be operable to store the update amounts $\Delta v_{i,j,k}^{[t]}$, $\Delta u_{i,j,k}^{(1)[t]}$, and $\Delta u_{i,j,k}^{(2)[t]}$ computed for one time point in the FIFO sequence. That is, the learning processing section 150 may be operable to update the learning parameters based on update amounts computed in the past.

The learning processing section 150 changes the ratio by which the update amounts are reflected in the learning parameters, according to the conditional probability of input data occurring at a following time point that is after the one time point t, for example. In this case, the learning processing section 150 may change the ratio by which the update amounts are reflected in the learning parameters according to the conditional probability of a hidden node value occurring at a plurality of following time points that are after the one time point. In the present embodiment, an example is described in which the learning processing section 150 changes the ratio by which the update amounts are reflected in the learning parameters according to the total likelihood p, after the one time point.

The learning processing section 150 may update the learning parameters as shown in the following expression, based on the total likelihood pa computed by K instances of learning from the time point t−K+1 to the time point t and on the update amount at the time point t−K+l, for example. Here, K may be an integer greater than or equal to 2, and if the learning processing section 150 stores the update amounts in the FIFO sequence, the length of the FIFO sequence may be equal to the value of K.

$$u_{i,j,k} \leftarrow u_{i,j,k} + \eta_1 p_j \Delta u_{i,j,k}^{[t-k+1]}$$

$$v_{i,j,l} \leftarrow v_{i,j,l} + \eta_1 p_j (\Delta v_{i,j,l}^{(1)[t-k+1]} + \Delta v_{i,j,l}^{(2)[t-k+1]}) \qquad \text{Expression 18:}$$

Here, $\eta_1$ may be a constant for adjusting the update amount. Alternatively, $\eta_1$ may be a coefficient whose value becomes smaller according to an increase in the number of updates. Yet further, $\eta_1$ may have a value of substantially 1 at the stage when the learning processing section 150 begins learning, and may be a coefficient whose value becomes smaller according to the amount of learning occurring as time progresses from the time point t. For example, $\eta_1 = \eta_{10}/t^2$. Furthermore, $\eta_1$ may be a coefficient whose value becomes smaller according to the update amount. For example, $\eta_1 = \eta_{10}/(\Sigma \Delta u_{i,j,k}^2)^{1/2}$. Here, $\eta_{10}$ may be a predetermined constant.

In the manner described above, the learning processing section 150 may update the learning parameters of a hidden node at one time point according to the conditional probabilities computed at time points before the one time point. In this way, the learning apparatus 100 can more strongly reflect the update amounts at time points before the one time in the learning parameters, in response to the predicted probability of an input value of an input node being large due to the weight parameters at time points before the one time point. That is, the learning apparatus 100 can update the weight parameters of the hidden nodes in a manner to increase the conditional probabilities.

If a FIFO sequence is used to perform an update of such a weight parameter, the learning processing section 150 may extract from the FIFO sequence the update amounts $\Delta v_{i,j,k}^{[t-k+1]}$, $\Delta u_{i,j,k}^{(1)[t-K+1]}$, and $\Delta u_{i,j,k}^{(2)[t-K+1]}$ of a past time point (e.g. t−K+1) at the following time point (e.g. t) or a time point thereafter. The learning processing section 150 may update the ratio by which the update extracted from the FIFO sequence are reflected in the learning parameters according to the conditional probabilities of hidden node values occurring at the following time point t. For example, the learning processing section 150 may multiply the total likelihood $p_j$ respectively by each update amount. In this way, the learning processing section 150 can efficiently perform the update of the weight parameters as described above.

The learning apparatus 100 according to the embodiment described above is an example in which the input value $x_j^{[0]}$ of each node is a binary value of 1 or 0. The learning apparatus 100 calculates the conditional probability for such binary data, but if time-series data made up of multi-values or real values is input as-is, the calculation result of the calculating section 140 cannot be handled as a probability. However, by using a value corresponding to a node value made up of a multi-value or a real value, the learning apparatus 100 can be made operable to process multi-value or real number time-series data. The following describes such a learning apparatus 100, as a second modification of the learning apparatus 100.

The learning apparatus 100 of the second modification can learn a model corresponding to multi-value or real number time-series input data, using substantially the same configuration as shown in FIG. 1 or FIG. 5. In the present embodiment, the second modification of the learning apparatus 100 is described using the configuration shown in FIG. 5. In this case, the acquiring section 110 may be operable to acquire time-series input data that is a time series of input data including a plurality of input values $x_j^{[0]}$. The input values $x_j^{[0]}$ may include multi-values or real values. The operation of the acquiring section 110 may be the same as the operation of the acquiring section 110 already described above, except that the time-series input data that is acquired includes multi-values or real values, and therefore this operation is omitted from the description.

The supplying section 120 may be operable to supply a plurality of the nodes of the model with a plurality of input values corresponding to pieces of input data at one time point in the time-series input data. In other words, the supplying section 120 may be operable to supply a plurality of input values to the input side of the FIFO memory 160. The operation of the supplying section 120 may be the same as the operation of the supplying section 120 already described above, except that the input values being stored include multi-values or real values, and therefore this operation is omitted from the description. Similarly, the operation of the storage section 130 may be the same as the operation of the storage section 130 already described above, except that the input values being stored include multi-values or real values, and therefore this operation is omitted from the description. Furthermore, the operation of the FIFO memory 160 may be the same as the operation of the FIFO memory 160 already described above, except that the input values being stored include multi-values or real values, and therefore this operation is omitted from the description.

The updating section 170 may be operable to update the update parameter using the values input to the FIFO memory 160 and the values output from the FIFO memory 160. The operation of the updating section 170 may be the same as the operation of the updating section 170 already described above, except that the input data includes multi-values or real values, and therefore this operation is omitted from the description.

The calculating section 140 may be operable to calculate the node value of each of a plurality of nodes of the model, instead of calculating a conditional probability or in addition to calculating a conditional probability. The calculating section 140 may be operable to, if the input value of a node is binary, calculate the conditional probability corresponding to this node. The calculation of the conditional probability performed by the calculating section 140 may be the same as the operation of the calculating section 140 already described above, and therefore this operation is omitted from the description.

The calculating section 140 may be operable to, if the input value of a node is a multi-value or a real value, calculate the node value corresponding to this node. The calculating section 140 may be operable to calculate an average value of possible values of a node on the condition that the input data sequence has occurred, as the node value of this node. The calculating section 140 may calculate each node value corresponding to each node at one time point, based on the input data series before the one time point in the time-series input data and the weight parameter in the model.

The learning processing section 150 may be operable to adjust the weight parameters in the model. The learning processing section 150 may be operable to, if the input value of a node is a binary value, further increase the conditional probability of the input data of this node occurring at one time point on the condition that the input data sequence has occurred. The adjustment of the weight parameters performed by the learning processing section 150 may be the same as the operation of the learning processing section 150 already described above, and therefore this operation is omitted from the description.

The learning processing section 150 may be operable to, if the input value of a node is a multi-value or a real value, update the weight parameter using the corresponding input value and the calculated error of the node value at one time point. Furthermore, the learning processing section 150 may be operable to further update the variance parameter for indicating variance in the probability distribution of the input value using the corresponding input value and the calculated error of the node value at one time point.

As described above, the learning apparatus 100 of the second modification may be operable to, if the input value of a node is a multi-value or a real value, express the input value of this node using the variance and the average value of the possible values of this node. The following describes the operation of the learning apparatus 100 of the second modification in a case where the input value of a node is a multi-value or a real value.

Figure 9:
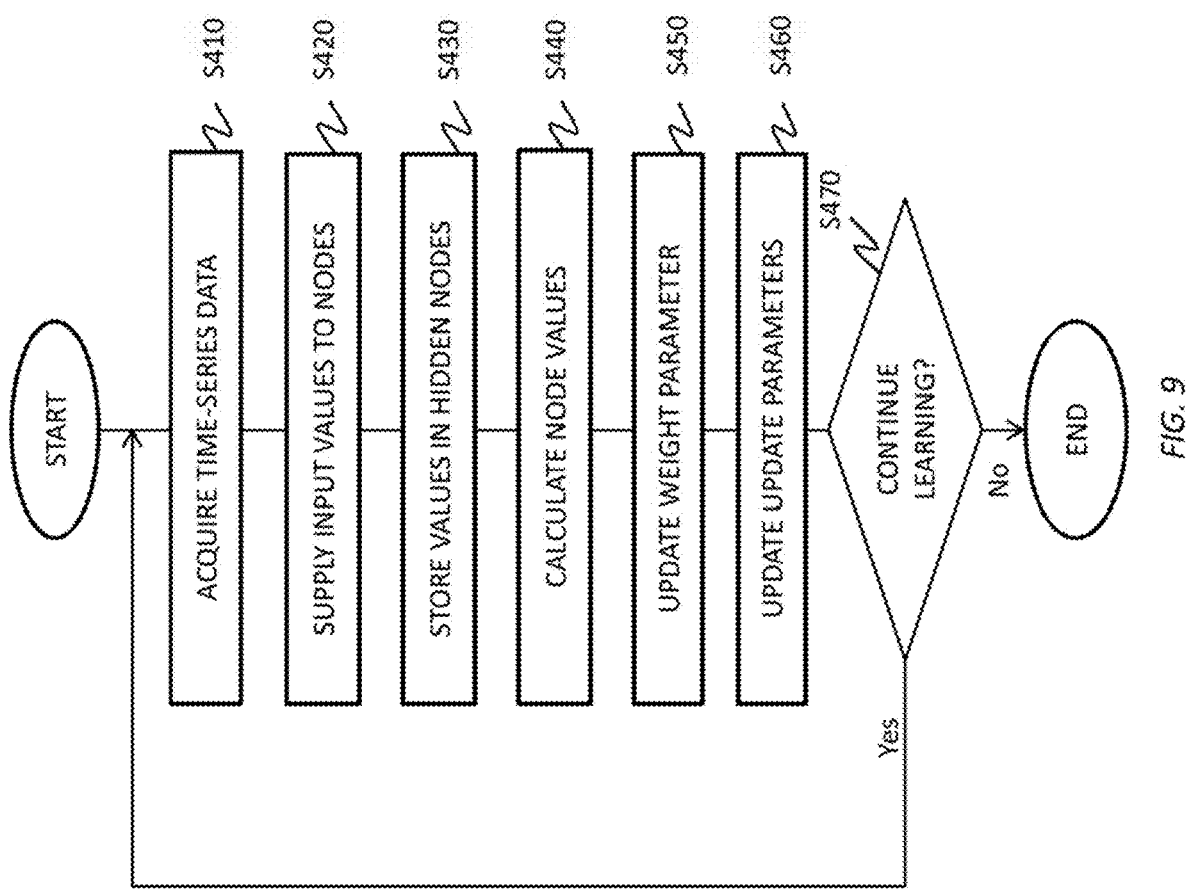
FIG. 9 shows an operational flow of a learning apparatus 100 of a second modification, in accordance with an embodiment of the present invention.

FIG. 9 shows an operational flow of the learning apparatus 100 of the second modification according to the present embodiment. FIG. 9 shows an example in which the learning apparatus 100 of the second modification operates according to a multi-value or real value input value, using the model shown in FIG. 6. Specifically, the learning apparatus 100 may be operable to calculate each propagation value ($\alpha_{i,j,k}$, $\beta_{i,j,l}$, and $\gamma_{i,l}$) weighted according to the passage of time points for each node value at a plurality of time points before the one time point. The calculating section 140 then propagates each propagation value to the plurality of nodes in the model in correspondence with the plurality of input values $x_j^{[t]}$ at the one time point t. In the present embodiment, a node that is a propagation destination corresponding to real number time-series input data is referred to as a first node. Here, the propagation destination node may be a node corresponding to a neuron j in the model 10.

First, the acquiring section 110 may acquire the multi-value or real value time-series data (S410). The acquiring section 110 may acquire the time-series data of an interval corresponding to a time from one time point to a time point that is a predetermined first number of time points before the one time point in the model 10. For example, the acquiring section 110 acquires T pieces of real value data arranged in time series.

Next, the supplying section 120 may supply the input values corresponding to the input data at the one time point in the time-series input data respectively to the input nodes corresponding to the 0-th layer of the model 10 (S420). Here, the input data supplied to each input node at the one time point t is $x_j^{[t]}$ ($1 \leq j \leq I$). The supplying section 120 may supply the input values corresponding to the input data series at time points before the one time point to the FIFO sequence 20 of the model 10 in order from the oldest time point. For example, a real value history up to when the input data reaches the input data $x_j^{[t]}$ in the time-series data is input to the FIFO sequence 20.

If hidden nodes are present in the model 10, the storage section 130 may sample the values of the hidden nodes corresponding to the one time point and respectively store the sampled values in the corresponding one or more hidden nodes j ($I+1 \leq j \leq I+H$) (S430). The storage section 130 may sample multi-values or real number values in correspondence with the time-series input data.

The calculating section 140 may calculate the node value $B_j^{[t]}$ corresponding to each input value $x_j^{[t]}$ ($1 \leq j \leq I$) of the input nodes at the one time point, based on the input values $x_j^{[-T,-1]}$ of the plurality of nodes including the hidden nodes and the weight parameters (S440). The calculating section 140 may be operable to calculate the node values $B_j^{[t]}$ of the first nodes among the plurality of nodes by using each propagation value propagated to a first node. The calculating section 140 may calculate the node value $B_j^{[t]}$ as shown in the following expression, based on each propagation value and the weight parameters.

$$B_j^{[t]} = b_j + \sum_{i=1}^{I+H}\left(\sum_{k \in K} u_{i,j,k}\alpha_{i,j,k} - \sum_{l \in L} v_{i,j,l}\beta_{i,j,l} - \sum_{l \in L} v_{j,i,l}\gamma_{i,l}\right) \quad \text{Expression 19}$$

In this way, when the time-series input data includes real values, the calculating section 140 may calculate the node value $B_j^{[t]}$ of a corresponding first node by using Expression 19, which is a portion of Expression 3. The node value $B_j^{[t]}$ of a first node at the one time point t calculated by the calculating section 140 is an average value of the possible values of this first node at the one time point t.

Next, the learning processing section 150 may update the weight parameter used when calculating each propagation value propagated to a first node by using the error (e.g. $x_j^{[t]} - B_j^{[t]}$) between the corresponding input value $x_j^{[t]}$ and the calculated node value $B_j^{[t]}$ at the one time (S450). Here, if the learning is performed using the gradient technique corresponding to the stochastic gradient technique described in Expressions 8 to 11, the learning processing section 150 may update the weight parameter based on a normal distribution. In other words, the learning processing section 150 may be operable to update the weight parameter by using the variance parameter $\sigma$ for indicating the variance in the probability distribution $p(x_j^{[t]})$ of the input values $x_j^{[t]}$ of the first nodes. In this case, the probability distribution $p(x_j^{[t]})$ of the input values $x_j^{[t]}$ is expressed as shown below.

$$p(x_j^{[t]}) = \frac{1}{\sqrt{2\pi}\,\sigma}\exp\left\{-\frac{(x_j^{[t]} - B_j^{[t]})^2}{2\sigma^2}\right\} \quad \text{Expression 20}$$

The learning processing section 150 may update the learning parameters as shown in the following expression. As shown in the following expression, when updating the weight parameters, the learning processing section 150 may set the update amount of the weight parameters to be smaller when the variance parameter $\sigma$ is larger. Furthermore, in the same manner as $\eta 1$, $\eta 2$ may be a constant for adjusting the update amount or may be a coefficient whose value becomes smaller according to an increase in the number of updates.

$$u_{i,j,k} \leftarrow u_{i,j,k} + \eta 2 \frac{1}{\sigma^2} \alpha_{i,j,k}^{[t-1]}(x_j^{[t]} - B_j^{[t]}) \quad \text{Expression 21}$$

$$v_{i,j,l} \leftarrow v_{i,j,l} + \eta 2 \frac{1}{\sigma^2} \beta_{i,j,l}^{[t-1]}(x_j^{[t]} - B_j^{[t]}) + \eta 2 \frac{1}{\sigma^2} \gamma_{i,l}^{[t-1]}(x_j^{[t]} - B_j^{[t]})$$

The learning processing section 150 may be operable to further update the variance parameter $\sigma$. For example, the learning processing section 150 may update the variance parameter $\sigma$ by using the error between the corresponding input value and the calculated node value at the one time for a first node. The learning processing section 150 may be operable to, when updating the variance parameter $\sigma$, update the variance parameter $\sigma$ based on the mathematical square of the error for each of a plurality of nodes, as shown in the expression below. In other words, the variance parameter $\sigma$ may be a parameter that is common to a plurality of input values.

$$\sigma \leftarrow \sigma + \eta 2\left(-\frac{I}{\sigma} + \frac{1}{\sigma^3}\sum_{j=1}^{I}(x_j^{[t]} - B_j^{[t]})^2\right) \quad \text{Expression 22}$$

Next, the updating section 170 may update the update parameter (S460). For example, the updating section 170 may update the update parameter as shown in the expression below. The updating section 170 may be operable to update the update parameter $\alpha_{i,j,k}$ based on the input value $x_j^{[t5]}$ that is a first number $d_{ij}$ of time points before the one time point ($t5 = t - d_{ij}$). Here, the update parameter $\alpha_{i,j,k}$ is set as a first update parameter. The updating section 170 may be operable to, when updating the first update parameter $\alpha_{i,j,k}$, update the first update parameter $\alpha_{i,j,k}$ by multiplying a first coefficient by the sum of the original update parameter $\alpha_{i,j,k}^{[t-1]}$ and the input value $x_j^{[t-5]}$ at a time point that is the first number $d_{ij}$ of time points before the one time point t. Here, the first predefined parameter $\lambda_k$ is set as the first coefficient.

$$\alpha_{i,j,k}^t \leftarrow \lambda_k \left( \alpha_{i,j,k}^{[t-1]} + x_i^{[t-d_{ij}]} \right)$$

$$\beta_{i,j,l}^{[t]} \leftarrow \sum_{s=-d_{ij}+1}^{-1} x_i^{[t+s]} \mu_l^s$$

$$\gamma_{i,l}^{[t]} \leftarrow \mu_l (\gamma_{i,l}^{[t-1]} + x_i^{[t]})$$

Expression 23

Here, since the time-series input data is a real number, the update parameter is also a real value. For example, it is possible for the change over time of the update parameters $\alpha_{i,j,k}$ and $\gamma_{i,l}$ to result in the input value being a negative value. In such a case, if the value of the input parameter at the time point when the input value became this negative value is less than an absolute value of this negative input value, the update parameter becomes a negative value. The update parameter calculated by the updating section 170 then exhibits a trend of increasing over time to draw near a value of 0.

In the manner described above, the learning processing section 150 can determine the learning parameters $u_{i,j,k}$ and $v_{i,j,l}$ and the variance parameter $\sigma$ by learning from the real number input data time series. Furthermore, the updating section 170 can update the update parameters. The learning apparatus 100 may judge whether to continue this learning (S470). The learning apparatus 100 may continue learning until reaching a predetermined number of learning processes, or may instead continue learning until a stop command is input from the user. As another example, the learning apparatus 100 may continue learning until there is no more time-series data that can be acquired.

If learning continues (S470: Yes), the learning apparatus 100 returns the processing to step S410 and, if there is no more time-series data to be supplied to the FIFO sequence 20, the acquiring section 110 may acquire the next piece of time-series data and the learning apparatus 100 may learn the model 10 based on this next piece of time-series data. The supplying section 120 supplies the next piece of real number data in the time-series data acquired by the acquiring section 110 to the corresponding FIFO sequence 20, for example. The supplying section 120 may supply the FIFO sequence 20 with the data from the oldest time point in in the time-series data to be supplied to the FIFO sequence 20. The storage section 130 may sample the values of a hidden layer and supply these values to the corresponding FIFO sequence 20.

The calculating section 140 may calculate the node value $B_j^{[t]}$ of the first node based on a value obtained by weighting the updated update parameter with the updated weight parameter. For example, the calculating section 140 may calculate the node value $B_j^{[t]}$ by using the value $u_{i,j,k} \cdot \alpha_{i,j,k}$ obtained by weighting the update first update parameter $\alpha_{i,j,k}$ with the first weight $u_{i,j,k}$ included in the updated weight parameter. The learning processing section 150 and the updating section 170 may update each parameter based on the new node value $B_j^{[t]}$.

In this way, the supplying section 120 and the storage section 130 may sequentially input new real values at subsequent time points to the FIFO sequences of the model 10. The calculating section 140 may calculate the new node value $B_j^{[t]}$ on the condition that there is a history of real values before the subsequent time point. The learning processing section 150 and the updating section 170 may sequentially perform learning of the real number time-series input data by updating each parameter.

If the learning is ended (S470: No), the learning processing section 150 may output each determined parameter and store these parameters in the external database 1000 or the like. As described above, the learning apparatus 100 of the second modification may be operable to form a Boltzmann machine that considers time expansion for predicting input data at one time point by using the average value and variance for real number time-series input data.

The above describes an example in which the learning apparatus 100 of the second modification operates according to real number or multi-value time-series input data. In addition to this, the learning apparatus 100 may be operable to operate according to time-series input data including real numbers, multi-values, and binary values. In other words, at least a portion of the plurality of input values may be multi-values or real values.

For example, the following describes a case in which one portion of the input values consists of multi-values or real values and another portion of the input values consists of binary values. In this case, the teaming apparatus 100 may calculate, for a first node associated with an input value that is a multi-value or real value among the plurality of input values, the node value $B_j^{[t]}$ of this first node based on the operational flow shown in FIG. 9.

Furthermore, the learning apparatus 100 may calculate, for a second node associated with an input value that is a binary value among the plurality of input values, the conditional probability described in FIGS. 1 to 8. In other words, the learning apparatus 100 may be operable to calculate the conditional probability of the second node being one of the two values of the binary value based on each propagation value ($\alpha_{i,j,k}$, $\beta_{i,j,l}$, and $\gamma_{i,l}$) propagated to the second node and the input value $x_j^{[t]}$ at the one time point corresponding to the second node.

In other words, the learning apparatus 100 may be operable to calculate the conditional probability of the value of a second node at one time point on a condition that an input data time series has occurred, based on the input data time series before the one time point in the binary time-series input data and this weight parameter in the model. The learning processing section 150 may adjust the weight parameter in the model to increase the conditional probability of input data occurring at the one time point on a condition that the input data time series has occurred.

The calculating section 140 may be operable to calculate, for a second node associated with an input value that is a binary value among the plurality of input values, the expected value $<X_j^{[t]}>$ of the node value of the second node, based on each propagation value ($\alpha_{i,j,k}$, $\beta_{i,j,l}$, and $\gamma_{i,l}$) propagated to the second node and the input value $x_j^{[t]}$ at the one time point corresponding to the second node. In this case, the calculating section 140 may be operable to update the weight parameter used to calculate each propagation value propagated to the second node by using the error $(x_j^{[t]} - <X_j^{[t]}>)$ between the corresponding input value $x_j^{[t]}$ and the expected value $<X_j^{[t]}>$ of the node value of the second node at the one time point t. The update of the weight parameter is the same as the operation described in Expression 17, Expression 18, and the like, and therefore is omitted from the description.

In the manner described above, the learning apparatus 100 may perform a different process for each model by respectively using a FIFO sequence 20 corresponding to real number or multi-value time-series input data and a FIFO sequence 20 corresponding to binary time-series input data. In this way, the learning apparatus 100 can be used for time-series input data including real numbers, multi-values, and binary values, and can therefore increase the expressive power and learning power and be applied in various fields such as moving images, languages, and music.

The learning apparatus 100 of the second modification described above is an example in which the calculating section 140 calculates the node value $B_j^{[t]}$ using Expression 19. However, the expression used by the calculating section 140 to calculate the node value $B_j^{[t]}$ is not limited to this. For example, the calculating section 140 may calculate the node value $B_j^{[t]}$ as shown by the following expression.

$$B_j^{[t]} = \qquad \text{Expression 24}$$
$$b_j + \sum_{i=1}^{l+H}\left(\sum_{k\in K} u_{i,j,k}\alpha_{i,j,k} - \sum_{\delta=1}^{d_{ij}-1} w_{ij}^{[\delta]} x_i^{[t-\delta]} - \sum_{l\in L} v_{j,i,l}\gamma_{i,l}\right)$$

In this way, the calculating section 140 may calculate the node value $B_j^{[t]}$ using a weight parameter including second weights $w_{ij}$ corresponding to input values at two or more time points between the one time point t and a time point that is a first number $d_{ij}$ of time points before the one time point t. Specifically, the calculating section 140 may calculate the node value $B_j^{[t]}$ using the $d_{ij}-1$ input values $x_i^{[t-\delta]}$ that are closest to the one time point t stored in the FIFO sequence 20. In other words, $\delta$ may be from 1 to $d_{ij}-1$. In this case, the calculating section 140 may use the second weights $w_{ij}^{[\delta]}$ corresponding respectively to the closest $d_{ij}-1$ input values $x_i^{[t-\delta]}$.

In this case, the learning processing section 150 may update each second weight $w_{ij}^{[\delta]}$ as shown in the following expression.

$$w_{ij}^{[\delta]} \leftarrow w_{ij}^{[\delta]} + \eta\frac{1}{\sigma^2} x_j^{[t-\delta]}(x_j^{[t]} - B_j^{[t]}) \qquad \text{Expression 25}$$

The calculation performed by the calculating section 140 using the closest input values and the corresponding second weights $w_{ij}^{[\delta]}$ is not limited to the calculation of the node value $B_j^{[t]}$. The calculating section 140 may use the closest input values and the corresponding second weights $w_{ij}^{[\delta]}$ in the same manner to calculate the conditional probability according to Expression 4. In this way, when calculating the node value $B_j^{[t]}$ and the conditional probability, the calculating section 140 can suitably reflect each of the closest input values believed to have a greater affect, and can therefore increase the learning power.

The calculation of the node value $B_j^{[t]}$ performed by the calculating section 140 may include a third weight instead of the second weight. The third weight may be a value $\mu_1^{[t-\delta]} x_i^{[t-\delta]}$ for weighting a value obtained by amplifying or attenuating, with a second coefficient $\mu_1$ according to the time point, the input values at each of the two or more time points between the one time point t and the time point that is a first number $d_{ij}$ of time points before the one time point t. Specifically, the calculating section 140 may calculate the node value $B_j^{[t]}$ using the $d_{ij}-1$ input values $x_i^{[t-\delta]}$ that are closest to the one time point t stored in the FIFO sequence 20. In other words, $\delta$ may be from 1 to $d_{ij}-1$, as shown in the expression below.

$$B_j^{[t]} = \qquad \text{Expression 26}$$
$$b_j + \sum_{i=1}^{l+H}\left(\sum_{k\in K} u_{i,j,k}\alpha_{i,j,k} - \sum_{\delta=1}^{d_{ij}-1} \mu_{ij}^{[\delta]} x_i^{[t-\delta]} - \sum_{l\in L} v_{j,i,l}\gamma_{i,l}\right)$$

The above describes an example in which the learning apparatus 100 of the second modification updates the node value $B_j^{[t]}$ using the variance parameter $\sigma$ indicating the variance in the probability distribution of the input values. However, the update of the node value $B_j^{[t]}$ performed by the learning apparatus 100 is not limited to this. The learning apparatus 100 may be operable to update the node value $B_j^{[t]}$ by using $\sigma^2$ instead of the variance parameter $\sigma$, and by using a natural gradient or the like, as shown in the expression below.

$$\sigma^2 \leftarrow \sigma^2 + \eta_2 \sum_{j=1}^{I}\left((x_j^{[t]} - B_j^{[t]})^2 - \sigma^2\right) \qquad \text{Expression 27}$$

Furthermore, the learning apparatus 100 of the second modification can determine the node value $B_j^{[t]}$ and the corresponding variance parameter $\sigma$ by learning, and therefore may be operable to further perform a function using this variance parameter a. For example, the learning apparatus 100 may be operable to detect peculiarity of the time-series input data of a learning target by using a learned model corresponding to the time-series input data of the investigation target.

In this case, the acquiring section 110 may be operable to acquire time-series input data of an investigation target that is a time-series of input data including a plurality of input values and different from the time-series input data used when performing the learning. The supplying section 120 may supply each input node of the model 10 with the time-series input data of the investigation target. The calculating section 140 may be operable to calculate the node value $B_j^{[t]}$ of a first node corresponding to the time-series input data of the investigation target by using each propagation value propagated to the first node. Furthermore, the learning processing section 150 may update each parameter.

In this way, the learning apparatus 100 can calculate the variance parameter $\sigma$ and the node value $B_j^{[t]}$ of a first node corresponding to the time-series input data of the investigation target. The learning apparatus 100 may then calculate the peculiarity of the input value corresponding to the first node of the time-series input data of the investigation target by comparing the variance parameter $\sigma_m$ corresponding to the time-series input data of the investigation target to a variance parameter $\sigma_0$ learned using the time-series input data of a learning target.

For example, if the expression shown below is established, the learning apparatus 100 may judge an input value $x_j^{[t]}$ to be peculiar. The constant $C_0$ may be a predetermined value. The constant $C_0$ is 3, for example. Furthermore, the learning apparatus 100 may output, as the peculiarity of an input value, $\varepsilon$ shown in Expression 27. In this way, the learning apparatus 100 can easily detect whether the data of the investigation target input in time series includes peculiar data that falls outside a range predicted by the learning.

$$\varepsilon = |x_j^{[t]} - B_j^{[t]}| > C_0 \sigma_0 \qquad \text{Expression 28:}$$

Furthermore, the learning apparatus 100 of the second modification can determine the node value $B_j^{[t]}$ and the corresponding variance parameter σ by learning, and therefore may be operable to generate new time-series data. The learning apparatus 100 may generate new time-series data based on a probability distribution having a variance corresponding to the variance parameter σ and having the average value of the input values at one time point as the node value $B_j^{[t]}$. The learning apparatus 100 can easily generate new time-series data corresponding to the learning by using random numbers or the like.

The learning apparatus 100 according to the present embodiment described above can be operable to process time-series data of binary data having two values, multi-values, and real numbers. Such a learning apparatus 100 learns the time-series data input to a finite number of nodes and makes a prediction, and therefore it is difficult for the learning apparatus 100 to adapt to a function that changes in time series. Furthermore, the learning apparatus 100 performs the learning and the predicting without using correlations between nodes.

Therefore, the learning apparatus 100 according to the present embodiment may be operable to learn a model corresponding to a target function that changes in time series, by using correlations between nodes. Furthermore, the learning apparatus 100 may be operable to predict the value of the target function by using a learned model corresponding to a target function that changes in time series. In other words, the learning apparatus 100 may be operable to predict the value of a function having infinite dimensions, by handling vectors with finite dimensions using a finite number of nodes. The following describes such a learning apparatus 100, as a third modification of the learning apparatus 100.

The learning apparatus 100 of the third modification may be operable to learn a model corresponding to a target function that changes in time series, and has substantially the same configuration as shown in FIG. 1 or FIG. 5. In the present embodiment, the third modification of the learning apparatus 100 is described using the configuration shown in FIG. 5. If not otherwise specified, the learning apparatus 100 may be operable to perform substantially the same operation as the learning apparatus 100 that is operable to learn the model corresponding to time-series input data that is real numbers.

In the learning apparatus 100 of the third modification, the acquiring section 110 may be operable to acquire time-series data that is a time series of input parameters including a plurality of parameter values expressing the target function. Here, the value of the target function at the time point t is $f^{[t]}(x)$. Furthermore, x may be a variable in the function f( ). The variable x may be a continuous value. The target function has a position in a one-dimensional or multi-dimensional space input thereto, and outputs a value relating to this position.

The present embodiment describes an example in which the target function $f^{[t]}(x)$ is the temperature at the position x. In this case, the variable x indicating the position may be a position vector in a two-dimensional space or three-dimensional space. For example, an observation result of the temperature at geographic locations $x_1^{[t]}, x_2^{[t]}, \ldots, x_k^{[t]}$ in the space at one time point t is $f^{[t]}(x_k^{[t]})$. In other words, the finite number of parameters expressing the target function $f^{[t]}(x)$ is $f^{[t]}(x_k^{[t]})$.

Here, the position vectors $x_1^{[t]}, x_2^{[t]}, \ldots, x_k^{[t]}$ of each geographic location at the one time point t are a first plurality of input values for the target function $f^{[t]}(x)$. In other words, the finite number of parameters $f^{[t]}(x_k^{[t]})$ are output values of the target function corresponding respectively to the first plurality of input values for the target function.

Here, the first plurality of input values may be values that can change at each time point. Each geographic location $x_k^{[t]}$ in the space may change according to the passage of time. For example, if the temperature is observed with a sensor or the like provided in a mobile object or the like, the observed geographic location is not constant. Furthermore, if such observation is performed, it is not necessarily the case that a constant number of observation results can be obtained, and therefore the number of the first plurality of input values $x_k^{[t]}$ may fluctuate according to time. The time-series data of such temperature observation results at each geographic location $x_k^{[t]}$ is represented as time-series data at a plurality of time points before the one time point t and as each parameter value such as $f^{(t-T, t-1]}(x_k^{(t-T, t-1]})$, in the present embodiment.

The acquiring section 110 may be operable to acquire time-series data obtained from such observation at each geographic location. The acquiring section 110 may acquire each parameter value at each time point, or may instead acquire each parameter value at a plurality of time points all together.

The supplying section 120 may be operable to supply a plurality of nodes with the plurality of parameters values input in correspondence with these nodes of the model. The plurality of nodes may correspond respectively to a second plurality of input values in a defined region of the target function $f^{[t]}(x)$. Here, the defined region of the target function $f^{[t]}(x)$ may be a range of geographic locations where the temperature is observed by the sensor or the like. If the sensor or the like moves, the defined region of the target function $f^{[t]}(x)$ may be substantially equal to the movement range of this sensor.

The second plurality of input values may be a predetermined plurality of positions $x_i'$ in the space. Specifically, the second plurality of input values $x_i'$ correspond to the observed geographic locations, whose number and positions do not change with respect to the passage of time. The first plurality of input values $x_k^{[t]}$ and the second plurality of input values $x_i'$ do not need to completely match. In the present embodiment, the number of input values in the second plurality of input values $x_i'$ is I (1≤k≤I).

The supplying section 120 may be operable to acquire a time-series parameter, which is a time series of input parameters including a plurality of parameter values expressing the target function. The supplying section 120 may be operable to calculate and acquire the time-series parameter corresponding to the second plurality of input values $x_i'$, based on the time-series data acquired by the acquiring section 110. The supplying section 120 may be operable to calculate and acquire the time-series parameter for each time point. In this case, the supplying section 120 may be operable to acquire the time-series parameter using a prediction function predicted by the learning apparatus 100. Here, the prediction function predicted by the learning apparatus 100 is $\mu^{[t]}(x)$. The prediction function $\mu^{[t]}(x)$ is described further below.

The supplying section 120 may be operable to supply each parameter value included in the time-series parameter to the plurality of nodes of the model at each time point. Specifically, the supplying section 120 may be operable to input each parameter value $f^{(t-T, t-1]}(x_i')$ to the input side of the FIFO memory 160 corresponding to an input node at each time point. For example, the neuron i (1≤i≤I) corresponds to the time-series parameter of the geographic location $x_i$, and the parameter value $f^{(t-T, t-1]}(x_i')$ is input thereto at each time point.

In this way, the learning apparatus 100 may be operable to propagate each propagation value, obtained by weighting each parameter value $f^{(t-T, t-1]}(x_i')$ at the plurality of time points before the one time point t according to the passage of time points, to the plurality of nodes in the model associated with the plurality of parameter values at the one time point. Furthermore, the learning apparatus 100 may be operable to calculate each node value of the plurality of nodes using each propagation value propagated to each node.

The updating section 170 may be operable to update the update parameters based on the values input to the FIFO memory 160 and the values output from the FIFO memory 160. Specifically, the updating section 170 may be operable to update the update parameters based on each parameter value $f^{[t]}(x_i')$ at the one time point t and the value output in response to each parameter value $f^{(t-T, t-1]}(x_i')$ at the plurality of time points before the one time point t being input to the FIFO memory 160.

The calculating section 140 may be operable to calculate the real number node value corresponding to a node, according to the real number input value of this node. The calculating section 140 may be operable to calculate each node value $\mu^{[t]}i$ corresponding to each parameter value $f^{[t]}(x_i')$ at the one time point t, in the same manner as the calculating section 140 of the learning apparatus 100 according to the second modification.

The learning processing section 150 may be operable to calculate the prediction function $\mu^{[t]}(x)$ corresponding to the target function $f^{[t]}(x)$, based on each node value $\mu^{[t]}_i$ calculated by the calculating section 140. For example, the learning processing section 150 may be operable to calculate the prediction function $\mu^{[t]}(x)$ by applying each node value $\mu^{[t]}_i$ at the one time point t in a predetermined function.

Furthermore, the learning processing section 150 may be operable to update the weight parameters used for calculating the propagation values propagated respectively to the plurality of nodes, using the difference between the target function $f^{[t]}x$ at the one time point t and the prediction function $\mu^{[t]}(x)$ predicted from the node values of the plurality of nodes. The learning processing section 150 may store the information concerning the prediction function $\mu^{[t]}(x)$ and the weight parameters to be updated in the storage section 130.

The learning processing section 150 may be operable to calculate the weight parameters using the difference between the output values $f^{[t]}(x_k^{[t]})$ of the target function corresponding to each input value $x_1^{[t]}, x_2^{[t]}, \ldots, x_k^{[t]}$ in the first plurality of input values and the output values $\mu^{[t]}(x_k^{[t]})$ of the prediction function at the one time point. In other words, the learning processing section 150 may be operable to update the weight parameters based on the difference between the observation result and the predicted result at the one time point t at each geographic location.

As described above, the learning apparatus 100 of the third modification may be operable to perform learning in a manner to bring the prediction function closer to the target function, using finite time-series data input to a finite number of nodes. The following describes the operation of the learning apparatus 100 of the third modification.

Figure 10:
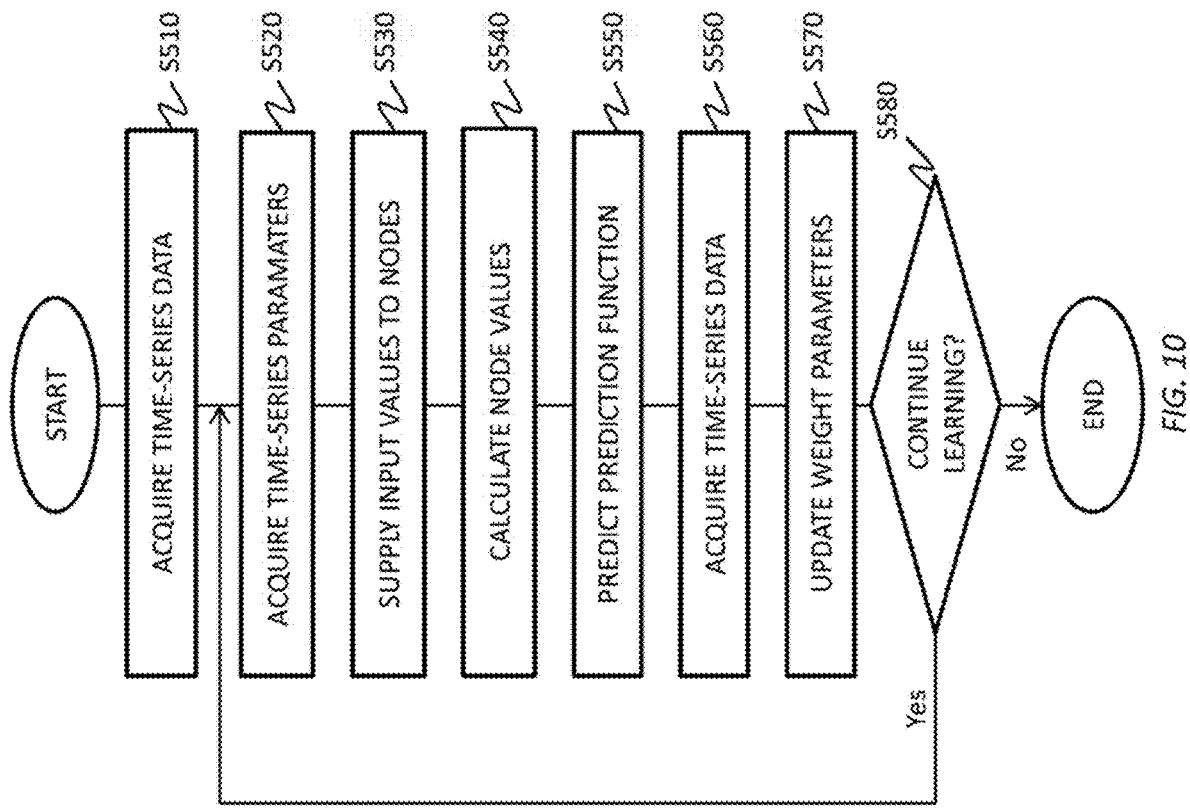
FIG. 10 shows an operational flow of the learning apparatus 100 of a third modification, in accordance with an embodiment of the present invention.

FIG. 10 shows an operational flow of the learning apparatus 100 of the third modification according to the present embodiment. In FIG. 10, an operational example is shown in which the learning apparatus 100 of the third modification predicts the target function using the model 10 shown in FIG. 6. In other words, the learning apparatus 100 may be operable to calculate each propagation value ($\alpha_{i,j,k}$, $\beta_{i,j,l}$, and $\gamma_{i,l}$) obtained by weighting, according to the passage of time points, each parameter value at a plurality of time points before the one time point, using the model 10.

First, the acquiring section 110 may acquire the time-series data (S510). The acquiring section 110 may acquire the time-series data at each time point Instead, the acquiring section 110 may acquire the time-series data at the plurality of time points before the one time point. In this case, the acquiring section 110 may acquire the time-series data in a predetermined interval corresponding to an interval from the time point t–T to the one time point t–I in the model 10. FIG. 10 shows an example in which the acquiring section 110 acquires the time-series data at each time point.

Next, the supplying section 120 may acquire the time-series parameter values corresponding to the time-series input data, at each time point (S520). The supplying section 120 may use the parameter values $f^{(t-T)}(x_k^{(t-T)})$ of the time-series input data as the parameter values $f^{(t-T)}(x_i')$ of the time-series parameter without alteration, at the initial time point $t_0$ (=t–T) at which the prediction function $\mu^{[t]}(x)$ has not been calculated. Furthermore, the supplying section 120 may use the parameter values of the time-series input data as the parameter values of the time-series parameter, during a predetermined interval.

Furthermore, the supplying section 120 may calculate the time-series parameter using a predetermined initial function. If the prediction function is being calculated, the supplying section 120 may calculate the time-series input data according to the time-series input data and this prediction function. The calculation of the time-series input data is described further below. The supplying section 120 may store information concerning the time-series data and the time-series parameter in the storage section 130.

The supplying section 120 may supply the model 10 with the time-series parameter, in the same manner as the learning apparatus 100 of the second modification (S530). Specifically, the supplying section 120 may supply each of the plurality of input nodes corresponding to the 0-th input layer of the model 10 with each parameter value of the time-series parameter, at each time point. The supplying section 120 may supply the plurality of input values corresponding to the time-series parameter before the one time point t to the FIFO sequence 20 of the model 10, in order from oldest to newest. For example, a history of the time-series parameter up to reaching the one time point t is input to the FIFO sequence 20.

If hidden nodes are present in the model 10, the storage section 130 may sample the values of the plurality of hidden nodes corresponding to each time point and respectively store the sampled values in the corresponding one or more hidden nodes j (I+1≤j≤I+H). The operation of hidden nodes has already been described, and therefore the description here is omitted.

Next, the calculating section 140 may calculate the node value corresponding to each input value of the input nodes at the next time point, based on the input values of the plurality of nodes and the weight parameter $W_{ij}^{[\delta]}$(S540). For example, if the plurality of input values corresponding to the time-series parameter before the one time point are each supplied to the corresponding FIFO sequence 20, the calculating section 140 calculates each node value $\mu^{[t]}_i$ at the one time point. The calculation of each node value by the calculating section 140 has already been described as the calculation of the node value $B_j^{[t]}$ of the learning apparatus 100 of the second embodiment, and therefore the description is omitted here.

Next, the learning processing section 150 may predict the prediction function $\mu^{[t]}(x)$ corresponding to the target function $f^{[t]}(x)$, based on each node value $\mu^{[t]}_i$ calculated by the calculating section 140 (S550). The learning processing section 150 predicts the prediction function $\mu^{[t]}(x)$ as shown in the following expression, using the kernel function $\{K(x, x_1'), K(x, x_2'), \ldots, K(x, x_i')\}$, for example.

$$\mu^{[t]}(x) = K(x, P)\mu^{[t]}$$ Expression 29

$$\mu^{[t]} = \begin{bmatrix} \mu_1^{[t]} \\ \mu_2^{[t]} \\ \vdots \\ \mu_i^{[t]} \end{bmatrix}$$

Here, P may be each observation position $(x_1', x_2', \ldots, x_i')$ corresponding to each node. Furthermore, various functions have been proposed as the kernel function, and the kernel function may be the function shown in the expression below, for example. Here, $\gamma$ may be a constant. The learning processing section 150 may adjust $\gamma$ to be a more suitable value by repeatedly calculating the prediction function.

$$K(x, x'; \gamma) = \exp(-\gamma \|x - x'\|^2)$$ Expression 30:

As described above, the learning processing section 150 can calculate, as the value of the target function $f^{[t]}(x)$ for an arbitrary x at the one time point t, the value of the prediction function $\mu^{[t]}(x)$ for this x at the one time point t, as shown in Expression 29. Accordingly, even if each observation position corresponding to each node differs from the observation position at the one time point t, it is possible to predict the output value $f^{[t]}(x_k^{[t]})$ of the target function at the one time point t as the output value $\mu^{[t]}(x_k^{[t]})$ of the prediction function. In this way, the learning apparatus 100 may be operable to calculate the output value $\mu^{[t]}(x_k^{[t]})$ of the prediction function corresponding to each input value in the first plurality of input values, from the node value of each of the plurality of nodes corresponding respectively to the input values in the second plurality of input values.

Next, if the acquiring section I 110 acquires the output value of the target function at each time point, i.e. the time-series parameter, the time-series parameter of the next time point may be acquired (S560). Furthermore, if the acquiring section 110 is acquiring time-series data at a plurality of time points, the learning processing section 150 may acquire the output value $f^{[t]}(x_k^{[t]})$ of the target function at the one time point t stored in the storage section 130. In this case, the acquiring section 110 may acquire the time-series data at the next plurality of time points in response to there being no more time-series data stored in the storage section 130. Here, an example is described in which the output value $f^{[t]}(x_k^{[t]})$ of the target function at the one time point t is acquired.

Next, the learning processing section 150 updates the weight parameters using the output value $f^{[t]}(x_k^{[t]})$ of the target function at the one time point t and the output value $\mu^{[t]}(x_k^{[t]})$ of the prediction function such as described above (S570). First, since the output value $\mu^{[t]}(x_k^{[t]})$ of the prediction function is being calculated, the supplying section 120 may calculate the time-series input data at the one time point t, according to the output value $f^{[t]}(x_k^{[t]})$ of the target function and this prediction function $\mu^{[t]}(x)$. For example, the supplying section 120 may calculate the parameter value $f^{(t)}(x_i')$ of the time-series parameter at this one time point t.

$$\begin{bmatrix} f^{(t)}(x_1') \\ f^{(t)}(x_2') \\ \vdots \\ f^{(t)}(x_i') \end{bmatrix} = \mu^{[t]} + K(P, X^{[t]}) K_{\sigma^2}(X^{[t]}, X^{[t]})^{-1} d^{[t]}(X^{[t]})$$ Expression 31

$$K_{\sigma^2}(x, x') := K(x, x') + \sigma^2 \delta_{x, x'}$$

Here, $X^{[t]}$ indicates each parameter value $f^{[t]}(x_k^{[t]})$ at the one time point t of the time-series data acquired by the acquiring section 110. Furthermore, $\delta_{x, x'}$ is the Kronecker delta. Yet further, $d^{[t]}(x)$ may be as shown in the following expression.

$$d^{[t]}(x) := f^{[t]}(x) - \mu^{[t]}(x)$$ Expression 32:

Specifically, $d^{[t]}(x)$ represents the difference between the target function $f^{[t]}(x)$ and the prediction function $\mu^{[t]}(x)$ at the one time point. Furthermore, $d^{[t]}(X^{[t]})$ represents the difference between the observed value $f^{[t]}(x_k^{[t]})$ at each position $x_k^{[t]}$ and the predicted value $\mu^{[t]}(x_k^{[t]})$ at each position $x_k^{[t]}$, at the one time point. If $\mu^{[t]}_i$ is being calculated, it is possible to calculate the predicted value $\mu^{[t]}(x_k^{[t]})$ using Expression 29, and therefore the supplying section 120 can calculate each parameter value $f^{(t)}(x_i')$ of Expression 31. In this way, the supplying section 120 may be operable to calculate the plurality of parameter values $f^{(t)}(x_i')$ at the one time point based on the node values $\mu^{[t]}_i$ of the plurality of nodes and the difference between the output value $f^{[t]}(x_k^{[t]})$ of the target function corresponding to each input value in the first plurality of input values and the output value $\mu^{[t]}(x_k^{[t]})$ of the prediction function.

The learning processing section 150 updates the weight parameters using each node value $\mu^{[t]}_i$ and each parameter value $f^{(t)}(x_i')$ at the one time point calculated in this manner. The learning processing section 150 may update the weight parameters using the error of the input values and the node values in the update of the weight parameters of the learning apparatus 100 of the second modification as the difference between the output value $f^{[t]}(x_k^{[t]})$ and the output value $\mu^{[t]}(x_k^{[t]})$. In this way, the learning apparatus 100 of the third modification can update the weight parameters, in the same manner as the learning apparatus 100 of the second modification. Furthermore, the updating section 170 may update the update parameters in the same manner. The weight parameter update and the update parameter update have already been described, and therefore the description of the update operation is omitted here.

The learning apparatus 100 may continue learning until reaching a predetermined number of learning processes, or may instead continue learning until a stop command is input from the user. Furthermore, the learning apparatus 100 may continue learning until there is no more time-series data that can be acquired.

The learning apparatus 100 may judge whether to continue this learning (S580). If the learning continues (S580: Yes), the learning apparatus 100 may return to step S520 and supply the calculated plurality of parameter values $f^{(t)}(x_i')$ at the one time point to each of the corresponding nodes in the plurality of nodes. In this way, the teaming apparatus 100 can predict the target function at the next time point t+1 based on the observed value at each geographic location at the plurality of time points before the next time point t+1. In this way, the learning apparatus 100 may sequentially learn the model corresponding to a function that changes in time series, by updating the weight parameters and update parameters.

If the learning is to end (S580: No), the learning processing section 150 may output each determined parameter and store these parameters in the external database 1000 or the like. In the manner described above, the learning apparatus 100 of the third modification may be operable to configure a Boltzmann machine that considers the time expansion for predicting a target function at one time point for a finite number of pieces of time-series input data.

The learning apparatus 100 of the third modification described above is described as an example in which the weight parameters are updated using each node value $\mu^{[t]}_i$ and each parameter value $f^{(t)}(x_i')$ at the one time point, using the same operation as the learning apparatus 100 of the second modification. Instead, the learning apparatus 100 of the third modification may update the weight parameters using the predicted value $\mu^{[t]}(x_k^{[t]})$ and the observed value $f^{[t]}(x_k^{[t]})$ at the one time point. In this case, the parameter vector θ including the weight parameters may be updated as shown below. Here, $\eta^{[t]}$ may be a learning rate for adjusting the update amount, and the constant C may be a constant that does not depend on the parameter vector θ.

$$\theta \leftarrow \theta + \eta^{[t]} \frac{\partial \mathcal{L}^{[t]}(\theta)}{\partial \theta}$$

$$\mathcal{L}^{[t]}(\theta) := \log P_\theta(f^{[t]}(X^{[t]}) \mid f^{|<t|})$$

$$= -\frac{1}{2} d^{[t]}(X^{[t]})^\top K_{\sigma^2}(X^{[t]}, X^{[t]})^{-1} d^{[t]}(X^{[t]}) + C$$

Expression 33

As described above, the learning apparatus 100 of the third modification can learn a model corresponding to a target function that changes in time series. In this way, the learning apparatus 100 can learn a function with infinite dimensions, and the number of pieces of time-series data acquired by the acquiring section 110 may be different at each time point. For example, the number of pieces of time-series data may be increased or decreased at each time point due to communication failure or the like. Here, if the number of pieces of time-series data at the one time point is decreased, the learning apparatus 100 is still operable to perform a prediction, but the prediction accuracy is reduced.

Therefore, the learning apparatus 100 may be operable to judge whether to perform learning according to the number of pieces of time-series data at each time point. For example, for the one time point, the learning apparatus 100 performs an update of the weight parameters corresponding to this one time point on a condition that the number of input values in the first plurality of input values exceeds a predetermined threshold value. Instead of or in addition to this, the learning apparatus 100 may change the learning rate of the weight parameters according to the number of input values in the first plurality of input values. The learning apparatus 100 may adjust the learning rate by adjusting the value of n or the like.

In the above, an example is described in which the learning apparatus 100 of the third modification performs prediction and learning of a target function. If the learning apparatus 100 has learned in this way, the learning apparatus 100 may perform only the prediction operation by using the learned model. In other words, the teaming apparatus 100 may be operable to predict the target function by performing an operation other than the update of the weight parameters in the learning operation described in FIG. 10.

In this case, first, the time-series parameter, which is the time-series of the input parameters including a plurality of parameter values that represent the target function, may be acquired. Then, each propagation value, obtained by weighting each parameter value at the plurality of time points before the one time point according to the passage of time points, may be propagated to the plurality of nodes in the model, in association with the plurality of parameter values at the one time point. Each node value of the plurality of nodes may then be calculated using each propagation value propagated to each node. The prediction function that is a prediction of the target function at the one time point from the node values of the plurality of nodes may then be calculated. Furthermore, the output value of the prediction function corresponding to each input value in the first plurality of input values may also be calculated.

The learning apparatus 100 of the third modification is described above as an example in which the supplying section 120 supplies the plurality of nodes in the model with the time-series parameter at each time point and the calculating section 140 calculates each node value at the one time point. In this way, the learning processing section 150 can update the weight parameters used for the calculation of the propagation values propagated to each node in the plurality of nodes, using the difference between the prediction function and the target function at the one time point. The supplying section 120 can then perform calculation using the weight parameters obtained by updating each node at the next time point, by supplying the time-series parameter at the next time point to the plurality of nodes, and update the next weight parameters. In this way, the learning apparatus 100 can perform the learning operation on-line.

Figure 11:
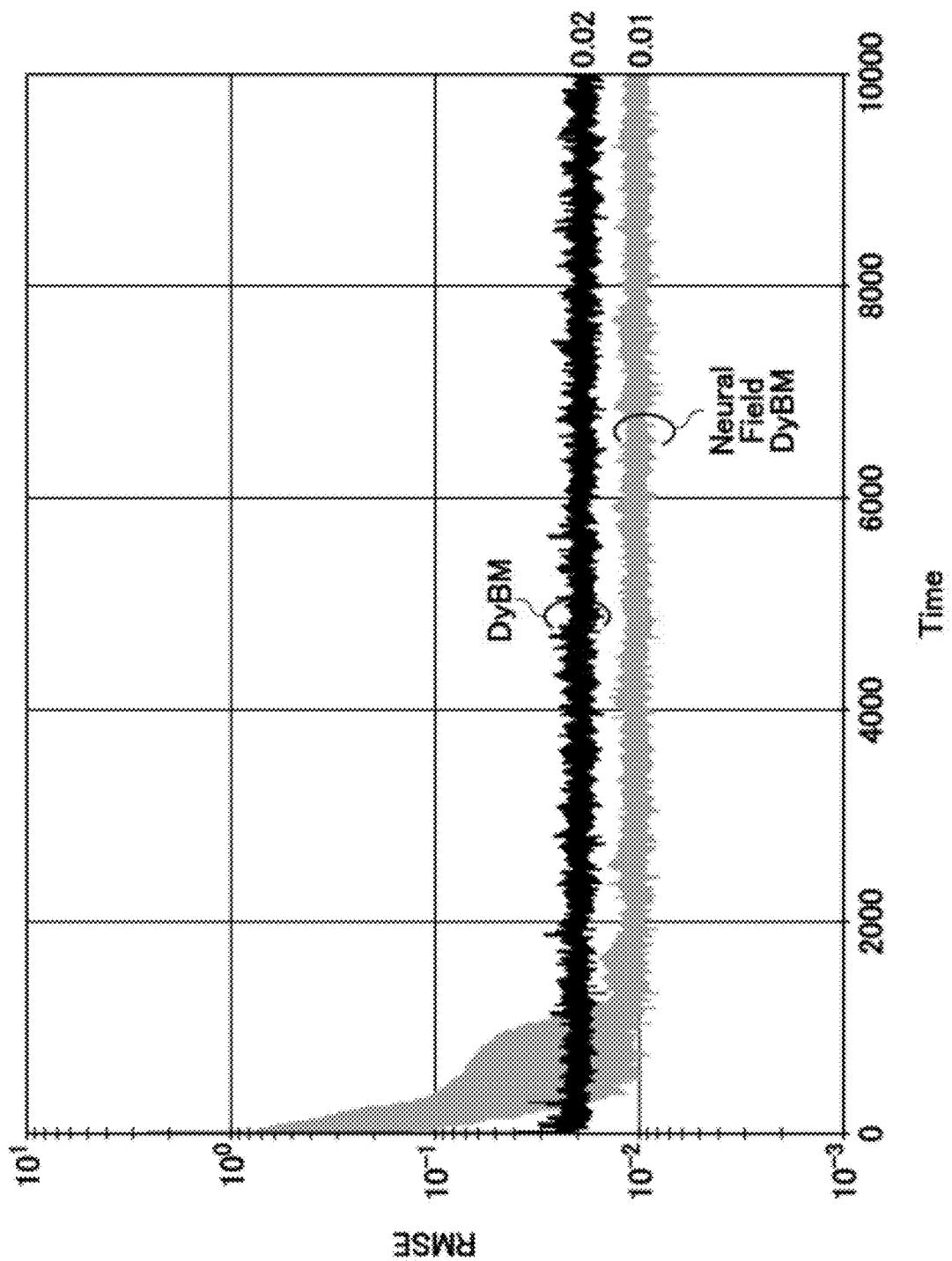
FIG. 11 shows exemplary learning results of the learning apparatus 100 of the third modification, in accordance with an embodiment of the present invention.

FIG. 11 shows exemplary learning results of the learning apparatus 100 of the third modification according to the present embodiment. FIG. 11 shows an example of results obtained by the learning apparatus 100 predicting the output value of a known target function. In FIG. 11, the horizontal axis indicates the learning time and the vertical axis indicates the RMSE (Root Mean Square Error) of the prediction result. In FIG. 1, the learning result of the learning apparatus 100 of the third modification is shown as "Neural Field DyBM." For comparison, the learning result of the learning apparatus 100 of the second modification is shown in FIG. 11 as "DyBM."

Specifically, FIG. 11 shows an example of the prediction result in a case where the number and positions of the observed geographic locations of the target function do not change over time and where the first plurality of input values $x_k^{[t]}$ and the second plurality of input values $x_i'$ completely match ($x_k^{[t]} = x_k$, k=i). Here, the target function $f^{[t]}(x)$ is a function as shown in the following expression. Furthermore, n indicates a value creating a normal distribution in which the average value is 0 and the standard deviation is 1.

$$f^{[t]}(x) = \sin(x^T 1 + t) + 0.01 n(n \sim N(0,1))$$

Expression 34:

Specifically, the target function $f^{[t]}(x)$ is a function having n terms as the terms for the pseudo observation noise. Even for an observed value that includes such observation noise, the learning apparatus 100 of the second modification was able to obtain a prediction result with good accuracy in which each node value $\mu^{[t]}_i$ corresponding to each parameter value $f^{[t]}(x_i')$ at the one time point t had an RMSE of approximately 0.02. Furthermore, compared to the learning apparatus 100 of the second modification, the learning apparatus 100 of the third modification was able to obtain an even more accurate prediction result.

If the first plurality of input values $x_k^{[r]}$ and the second plurality of input values $x_i'$ completely match, the learning operation of the learning apparatus 100 of the third modification differs from the learning operation of the learning apparatus 100 of the second modification by using correlations between nodes. In other words, it is understood that the learning apparatus 100 of the third modification can perform more accurate learning by using the correlations between nodes.

Figure 12:
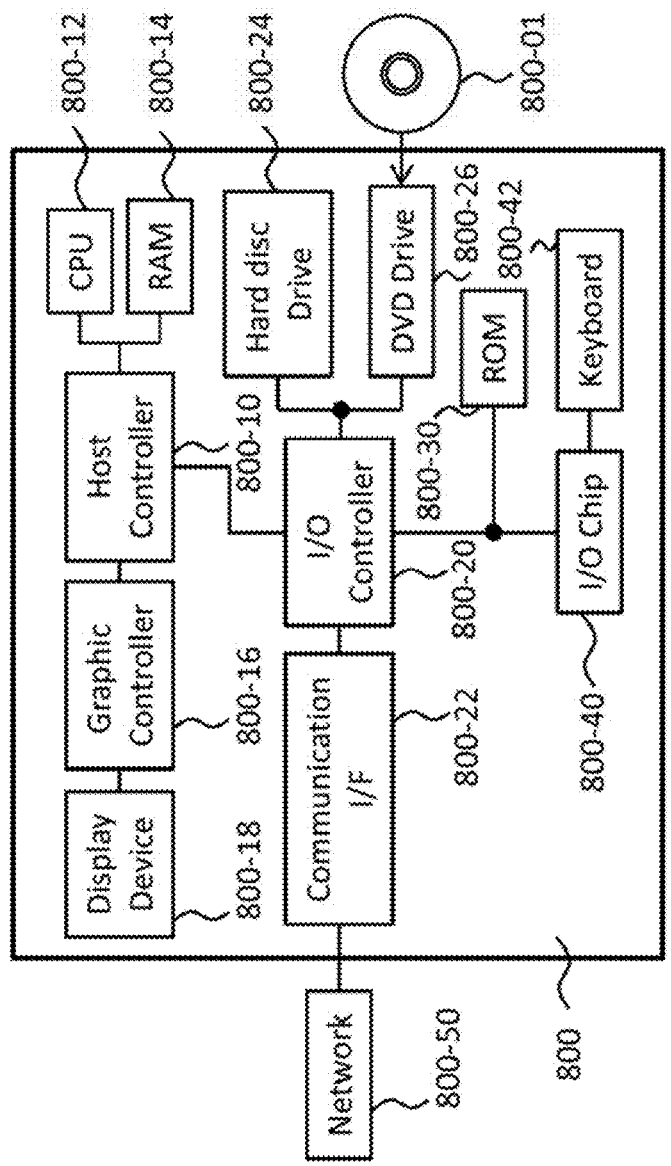
FIG. 12 shows an exemplary hardware configuration of a computer, in accordance with an embodiment of the present invention.

FIG. 12 shows an example of a computer 800 in which aspects of the present invention may be wholly or partly embodied. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program may be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 may also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method may be constituted by realizing the operation or processing of information in accordance with the usage of the computer 800.

For example, when communication is performed between the computer 800 and an external device, the CPU 800-12 may execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 may cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 may then write back the processed data to the external recording medium.

Various types of information, such as various types of programs, data, tables, and databases, may be stored in the recording medium to undergo information processing. The CPU 800-12 may perform various types of processing on the data read from the RAM 800-14, which includes various types of operations, processing of information, condition judging, conditional branch, unconditional branch, search/replace of information, etc., as described throughout this disclosure and designated by an instruction sequence of programs, and writes the result back to the RAM 800-14. In addition, the CPU 800-12 may search for information in a file, a database, etc., in the recording medium. For example, when a plurality of entries, each having an attribute value of a first attribute associated with an attribute value of a second attribute, are stored in the recording medium, the CPU 800-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

Thus, in an embodiment, the present invention can relate to one or more models. The one or more models can correspond to, for example, a neural network (NN), a Boltzmann machine, and so forth. The neural network can be, but is not limited to, a feedforward neural network, a recurrent neural network, a probabilistic neural network, a convolutional neural network, and so forth. The model/NN can be used for applications including, but not limited to, function approximation (e.g., time series prediction, fitness approximation, etc.) speech recognition, speaker recognition, pattern recognition, pattern classification, sequence (gesture, speech, handwriting, etc.) recognition, and so forth. Moreover, in an embodiment, an action can be performed (through communication interface 800-22) based on a result of using the model/NN. For example, upon recognition a speaker, or a password uttered by a speaker, a lock can be unlocked to permit the user access to an object or facility. These and other applications to which the present invention can be applied are readily determined by one of ordinary skill in the art given the teachings of the present invention provided herein, while maintaining the spirit of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette; a hard disk; a random access memory (RAM); a read-only memory (ROM); an erasable programmable read-only memory (EPROM or Flash memory); a static random access memory (SRAM); a portable compact disc read-only memory (CD-ROM); a digital versatile disk (DVD); a memory stick; a floppy disk; a mechanically encoded device such as punchcards or raised structures in a groove having instructions recorded thereon; and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can adapt to a function with infinite dimensions that changes in time series, while learning time-series data input to a finite number of nodes, by using the correlations between nodes.

What is claimed is:

1. A computer-implemented method for learning a model corresponding to a geographic-based target function, comprising:
    acquiring a time-series parameter that is a time series of input parameters that include a plurality of parameter values expressing the geographic-based target function;
    propagating each of a plurality of propagation values, which are obtained by weighting each of the plurality of parameters values at a plurality of time points before one time point according to a passage of the plurality of time points, to a plurality of nodes in the model associated with the plurality of parameter values at the one time point;
    calculating a node value of each of the plurality of nodes using a respective one of the plurality of propagation values propagated to each of the plurality of nodes; and
    updating a weight parameter used for calculating the plurality of propagation values propagated to the plurality of nodes, using a difference between the geographic-based target function at the one time point and a prediction function obtained by making a prediction from node values of the plurality of nodes.

2. The computer-implemented method of claim 1, further comprising for the one time point, acquiring an output value of the geographic-based target function corresponding to each input value in a first plurality of input values for the geographic-based target function, wherein the updating step includes updating the weight parameter using a difference between the output value of the geographic-based target function corresponding to the each input value in the first plurality of input values and an output value of the prediction function, at the one time point.

3. The computer-implemented method of claim 2, wherein each of the plurality of nodes corresponds to an input value in a second plurality of input values in a defined region of the geographic-based target function.

4. The computer-implemented method of claim 3, wherein at least a subset of the first plurality of input values and the second plurality of input values are different.

5. The computer-implemented method of claim 4, wherein the updating step includes calculating the output value of the prediction function corresponding to the each input value in the first plurality of input values, from each node value of the plurality of nodes corresponding to the input values in the second plurality of input values.

6. The computer-implemented method of claim 5, wherein the acquiring step includes calculating the plurality of parameter values at the one time point based on the node values of the plurality of nodes and a difference between the output value of the prediction function and the output value of the geographic-based target function corresponding to the each input value in the first plurality of input values.

7. The computer-implemented method of claim 4, wherein at least a subset of the first plurality of input values are different at each time point.

8. The computer-implemented method of claim 2, wherein the updating step includes performing the updating of the weight parameter corresponding to the one time point on a condition that a number of input values in the first plurality of input values exceeds a threshold value at the one time point.

9. The computer-implemented method of claim 2, wherein the updating step includes changing a learning rate of the weight parameter according to a number of input values in the first plurality of input values.

10. The computer-implemented method of claim 1, wherein the geographic-based target function has a position in a one-dimensional or multi-dimensional space input thereto, and outputs a value relating to the position.

11. A computer-implemented method of using a model that has been learned corresponding to a geographic-based target function, the method comprising:
    acquiring a time-series parameter that is a time series of input parameters that include a plurality of parameter values expressing the geographic-based target function;
    propagating each of a plurality of propagation values, which are obtained by weighting each of the plurality of parameters values at a plurality of time points before one time point according to a passage of the plurality of time points, to a plurality of nodes in the model associated with the plurality of parameter values at the one time point;
    calculating a node value of each of the plurality of nodes using a respective one of the plurality of propagation values propagated to each of the plurality of nodes; and
    calculating a prediction function that is a prediction of the geographic-based target function at the one time point from node values of the plurality of nodes.

12. The computer-implemented method of claim 11, further comprising calculating an output value of the prediction function corresponding to each input value in a first plurality of input values.

13. The computer-implemented method of claim 12, wherein each of the plurality of nodes corresponds to an input value in a second plurality of input values in a defined region of the geographic-based target function.

14. The computer-implemented method of claim 13, wherein at least some of the first plurality of input values and the second plurality of input values are different.

15. The computer-implemented method of claim 11, further comprising updating a weight parameter used for calculating the respective one of the plurality of propagation values propagated to each of the plurality of nodes, using a difference between the prediction function and the geographic-based target function at the one time point.

16. A non-transitory computer readable storage medium having instructions embodied therewith, the instructions executable by a processor or programmable circuitry to cause the processor or programmable circuitry to perform a method, the method comprising:
    acquiring a time-series parameter that is a time series of input parameters including a plurality of parameter values expressing a geographic-based target function;
    propagating each of a plurality of propagation values, which are obtained by weighting each of a plurality of parameters values at a plurality of time points before one time point according to passage of the time points, to a plurality of nodes in a model corresponding to the geographic-based target function associated with the plurality of parameter values at the one time point;
    calculating a node value of each of the plurality of nodes using a respective one of the plurality of propagation values propagated to each of the plurality of nodes; and
    updating a weight parameter used for calculating the propagation values propagated to each of the plurality of nodes, using a difference between the geographic-based target function at the one time point and a prediction function obtained by making a prediction from node values of the plurality of nodes.

17. The non-transitory computer readable storage medium of claim 16, wherein the method further comprises, for the one time point, acquiring an output value of the geographic-based target function corresponding to each input value in a first plurality of input values for the geographic-based target function, and wherein the updating step includes updating the weight parameter using a difference between the output value of the geographic-based target function corresponding to the each input value in the first plurality of input values and an output value of the prediction function, at the one time point.

18. The non-transitory computer readable storage medium of claim 17, wherein each of the plurality of nodes corresponds to an input value in a second plurality of input values in a defined region of the geographic-based target function.

19. The non-transitory computer readable storage medium of claim 18, wherein at least a subset of the first plurality of input values and the second plurality of input values are different.

20. An apparatus comprising:
    a processor or programmable circuitry operable to execute instructions,
    a non-transitory computer readable storage medium having the instructions embodied therewith, the instructions executable by the processor or programmable circuitry to cause the processor or programmable circuitry to perform a method; and
    wherein the method includes:
        acquiring a time-series parameter that is a time series of input parameters including a plurality of parameter values expressing a geographic-based target function;
        propagating each of a plurality of propagation values, which are obtained by weighting each of a plurality of parameters values at a plurality of time points before one time point according to passage of the time points, to a plurality of nodes in a model corresponding to the geographic-based target function associated with the plurality of parameter values at the one time point;
        calculating a node value of each of the plurality of nodes using a respective one of the plurality of propagation values propagated to each of the plurality of nodes; and
        updating a weight parameter used for calculating the propagation values propagated to each of the plurality of nodes, using a difference between the geographic-based target function at the one time point and a prediction function obtained by making a prediction from node values of the plurality of nodes.

21. A non-transitory computer readable storage medium having instructions embodied therewith, the instructions executable by a processor or programmable circuitry to cause the processor or programmable circuitry to perform a method, the method comprising:
    acquiring a time-series parameter that is a time series of input parameters including a plurality of parameter values expressing a geographic-based target function;
    propagating each of a plurality of propagation values, which are obtained by weighting each of a plurality of parameters values at a plurality of time points before one time point according to passage of the time points, to a plurality of nodes in a model corresponding to the geographic-based target function associated with the plurality of parameter values at the one time point;
    calculating a node value of each of the plurality of nodes using a respective one of the plurality of propagation values propagated to each node; and
    calculating a prediction function that is a prediction of the geographic-based target function at the one time point from the node values of the plurality of nodes.

22. The non-transitory computer readable storage medium of claim 21, wherein the method further comprises calculating an output value of the prediction function corresponding to each input value in a first plurality of input values.

23. The non-transitory computer readable storage medium of claim 22, wherein each of the plurality of nodes corresponds to an input value in a second plurality of input values in a defined region of the geographic-based target function.

24. The non-transitory computer readable storage medium of claim 21, wherein the method further comprises updating a weight parameter used for calculating the respective one of the plurality of propagation values propagated to each of the plurality of nodes, using a difference between the prediction function and the geographic-based target function at the one time point.

25. An apparatus comprising:
    a processor or programmable circuitry operable to execute instructions,
    a non-transitory computer readable storage medium having the instructions embodied therewith, the instructions executable by the processor or programmable circuitry to cause the processor or programmable circuitry to perform a method; and
    wherein the method includes:
        acquiring a time-series parameter that is a time series of input parameters including a plurality of parameter values expressing a geographic-based target function;
        propagating each of a plurality of propagation values, which are obtained by weighting each of a plurality of parameters values at a plurality of time points before one time point according to passage of the time points, to a plurality of nodes in a model corresponding to the geographic-based target function associated with the plurality of parameter values at the one time point;

calculating a node value of each of the plurality of nodes using a respective one of the plurality of propagation values propagated to each node; and calculating a prediction function that is a prediction of the geographic-based target function at the one time point from the node values of the plurality of nodes.

* * * * *